(12) United States Patent
Matsuyama

(10) Patent No.: US 10,632,796 B2
(45) Date of Patent: Apr. 28, 2020

(54) PNEUMATIC TIRE

(71) Applicant: BRIDGESTONE CORPORATION, Chuo-ku, Tokyo (JP)

(72) Inventor: Ryunosuke Matsuyama, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 218 days.

(21) Appl. No.: 15/559,521

(22) PCT Filed: Mar. 10, 2016

(86) PCT No.: PCT/JP2016/001357
§ 371 (c)(1),
(2) Date: Sep. 19, 2017

(87) PCT Pub. No.: WO2016/152062
PCT Pub. Date: Sep. 29, 2016

(65) Prior Publication Data
US 2018/0117971 A1  May 3, 2018

(30) Foreign Application Priority Data

Mar. 26, 2015 (JP) .................................. 2015-065131
Sep. 9, 2015  (JP) .................................. 2015-177792

(51) Int. Cl.
*B60C 11/12* (2006.01)
*B60C 11/03* (2006.01)
*B60C 11/04* (2006.01)

(52) U.S. Cl.
CPC ...... *B60C 11/1218* (2013.01); *B60C 11/0302* (2013.01); *B60C 11/0304* (2013.01);
(Continued)

(58) Field of Classification Search
CPC ............. B60C 11/0302; B60C 11/0304; B60C 11/1218; B60C 2011/1227;
(Continued)

(56) References Cited

U.S. PATENT DOCUMENTS 9,278,583 B2 * 3/2016 Murata ............... B60C 11/0306
9,340,071 B2 * 5/2016 Kujime ............... B60C 11/0304
2009/0078350 A1 3/2009 Ohashi

FOREIGN PATENT DOCUMENTS

CN    1853965 A      11/2006
DE  102009044829 A1   6/2011
(Continued)

OTHER PUBLICATIONS

Mar. 1, 2018, Search Result of Extended European Search Report issued by the European Patent Office in the corresponding European Patent Application No. 16767972.9.
(Continued)

*Primary Examiner* — Jodi C Franklin
*Assistant Examiner* — Alexander A Wang
(74) *Attorney, Agent, or Firm* — Kenja IP Law PC

(57) ABSTRACT

In the pneumatic tire according to this disclosure, a plurality of sipes on a tread surface include a large intermediate width sipe 4 having: a pair of intermediate sipe wall surface portions 61, a pair of bottom-side sipe wall surface portions 62 and a pair of tread-surface-side sipe wall surface portions 63; and within a central region of the tread surface, a spacing along a tire circumferential direction between the large intermediate width sipe and another sipe or groove is 2.0 to 4.0 times of a sipe depth D of the large intermediate width sipe.

20 Claims, 10 Drawing Sheets

(52) U.S. Cl.
CPC .......... *B60C 11/04* (2013.01); *B60C 11/1236* (2013.01); *B60C 11/1259* (2013.01); *B60C 11/1272* (2013.01); *B60C 11/1281* (2013.01); *B60C 11/032* (2013.01); *B60C 11/0323* (2013.01); *B60C 2011/129* (2013.01); *B60C 2011/1227* (2013.01); *B60C 2011/1268* (2013.01); *B60C 2011/1286* (2013.01)

(58) Field of Classification Search
CPC .............. B60C 11/1281; B60C 11/032; B60C 11/0323; B60C 11/1272; B60C 2011/129
See application file for complete search history.

(56) References Cited

FOREIGN PATENT DOCUMENTS

| | | |
|---|---|---|
| EP | 2138330 A1 | 12/2009 |
| EP | 2868494 A1 | 5/2015 |
| JP | H09254610 A | 9/1997 |
| JP | 2000094908 A | 4/2000 |
| JP | 2001055019 A | 2/2001 |
| JP | 2001130227 A | 5/2001 |
| JP | 2005262973 A | 9/2005 |
| JP | 2006298057 A | 11/2006 |
| JP | 2008290521 A | 12/2008 |
| JP | 2008290573 A | 12/2008 |
| JP | 2010125977 A | 6/2010 |
| JP | 2010274846 A | 12/2010 |
| JP | 2013107501 A | 6/2013 |
| JP | 2013129325 A | 7/2013 |
| WO | 2014002697 A1 | 1/2014 |

OTHER PUBLICATIONS

Oct. 29, 2018, search result of Office Action issued by the State Intellectual Property Office in the corresponding Chinese Patent Application No. 201680018734.X.

* cited by examiner

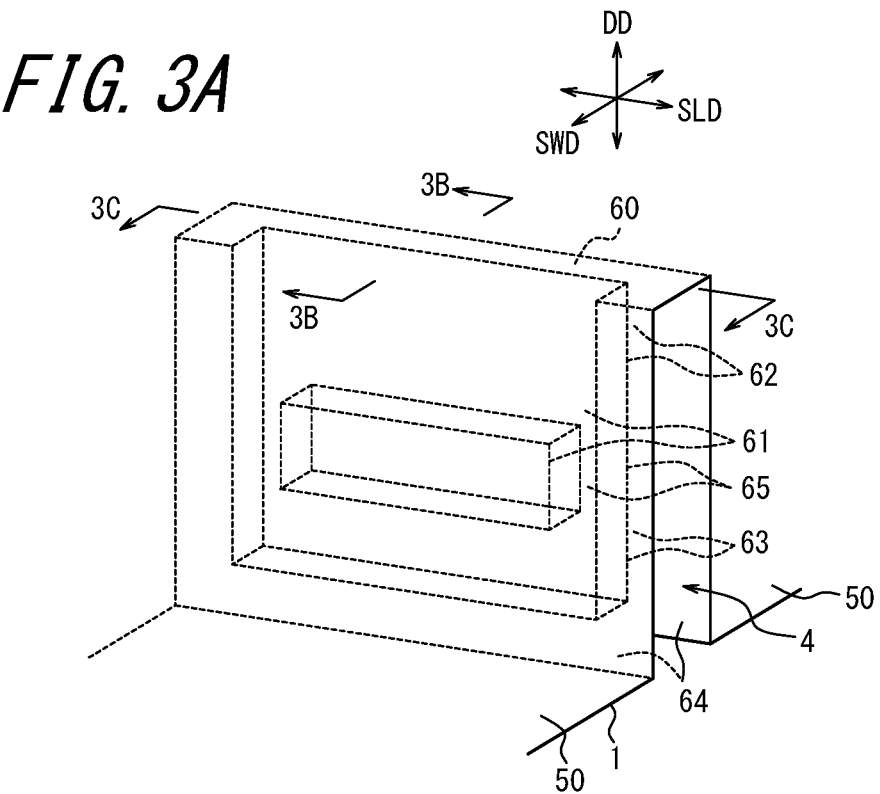
FIG. 3A
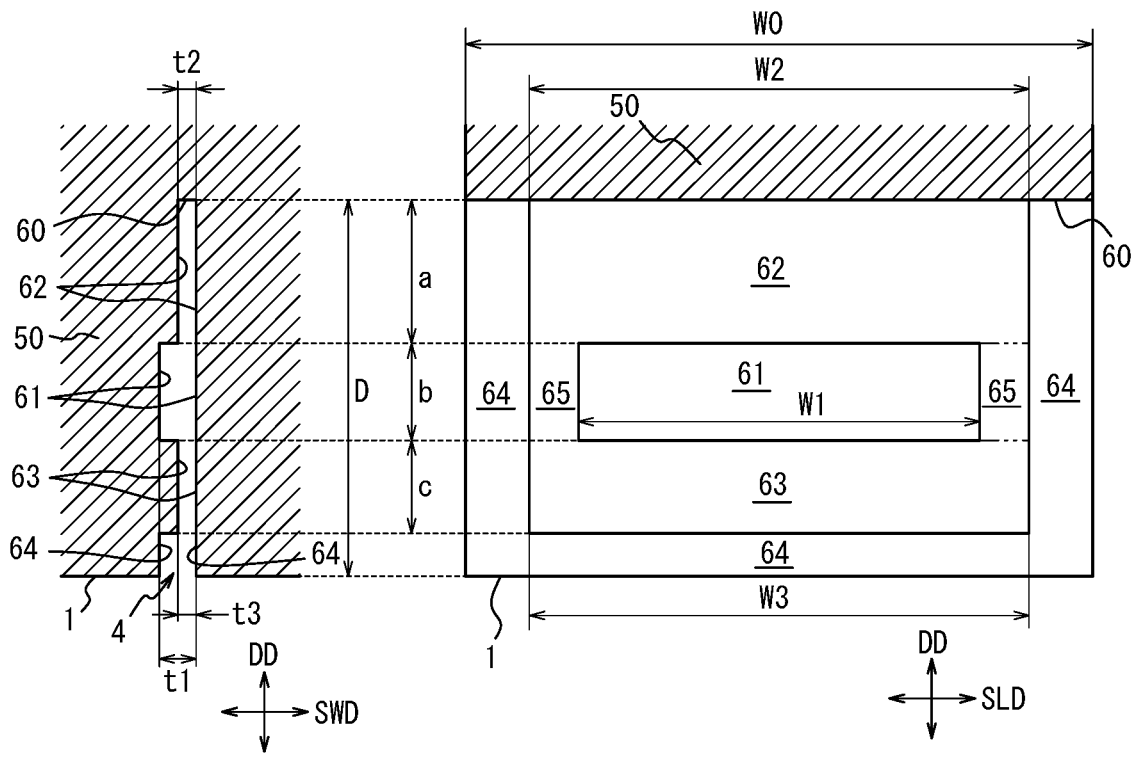
FIG. 3B
FIG. 3C

FIG. 5A
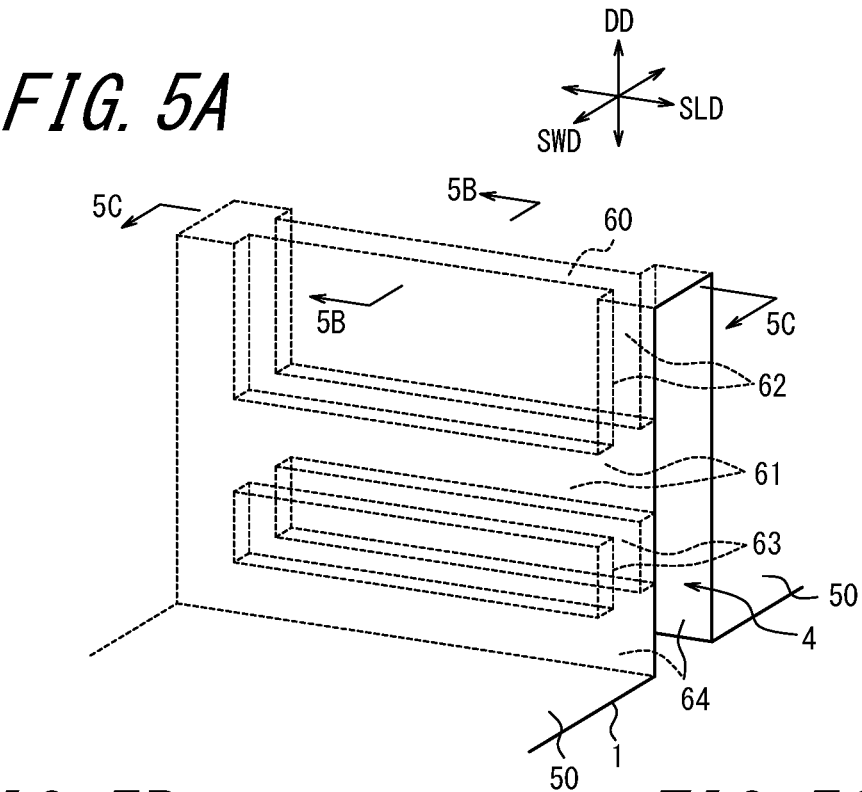
FIG. 5B
FIG. 5C
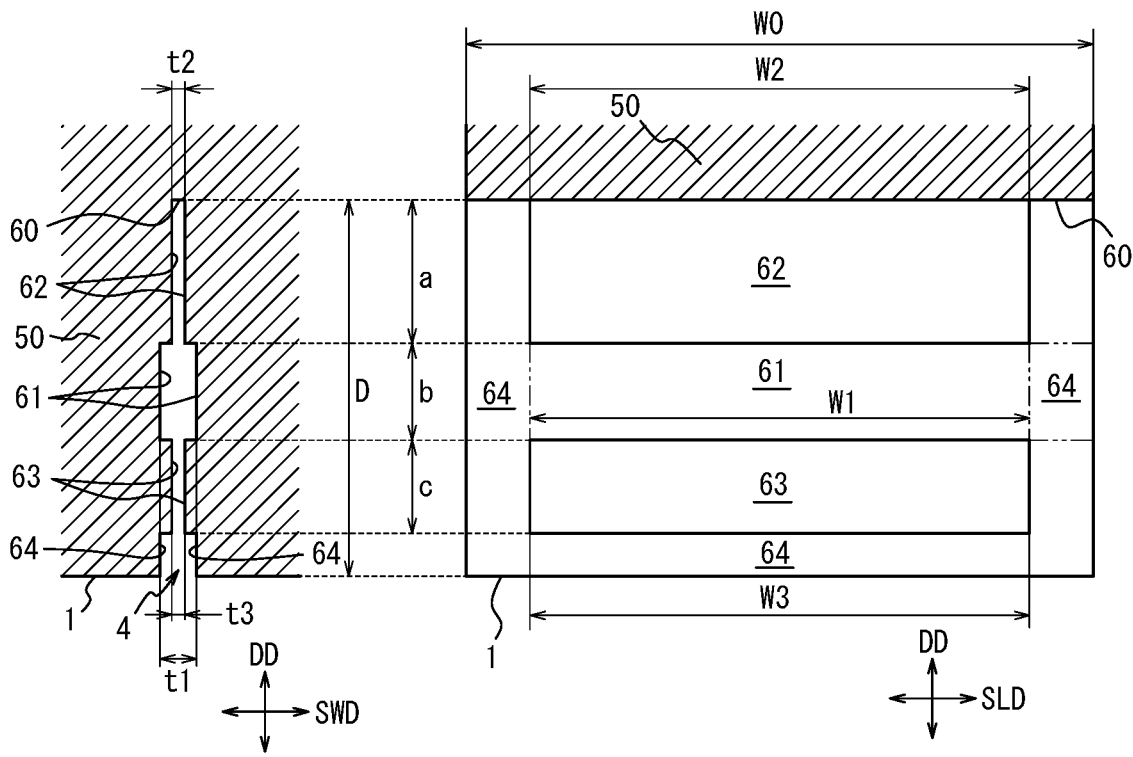

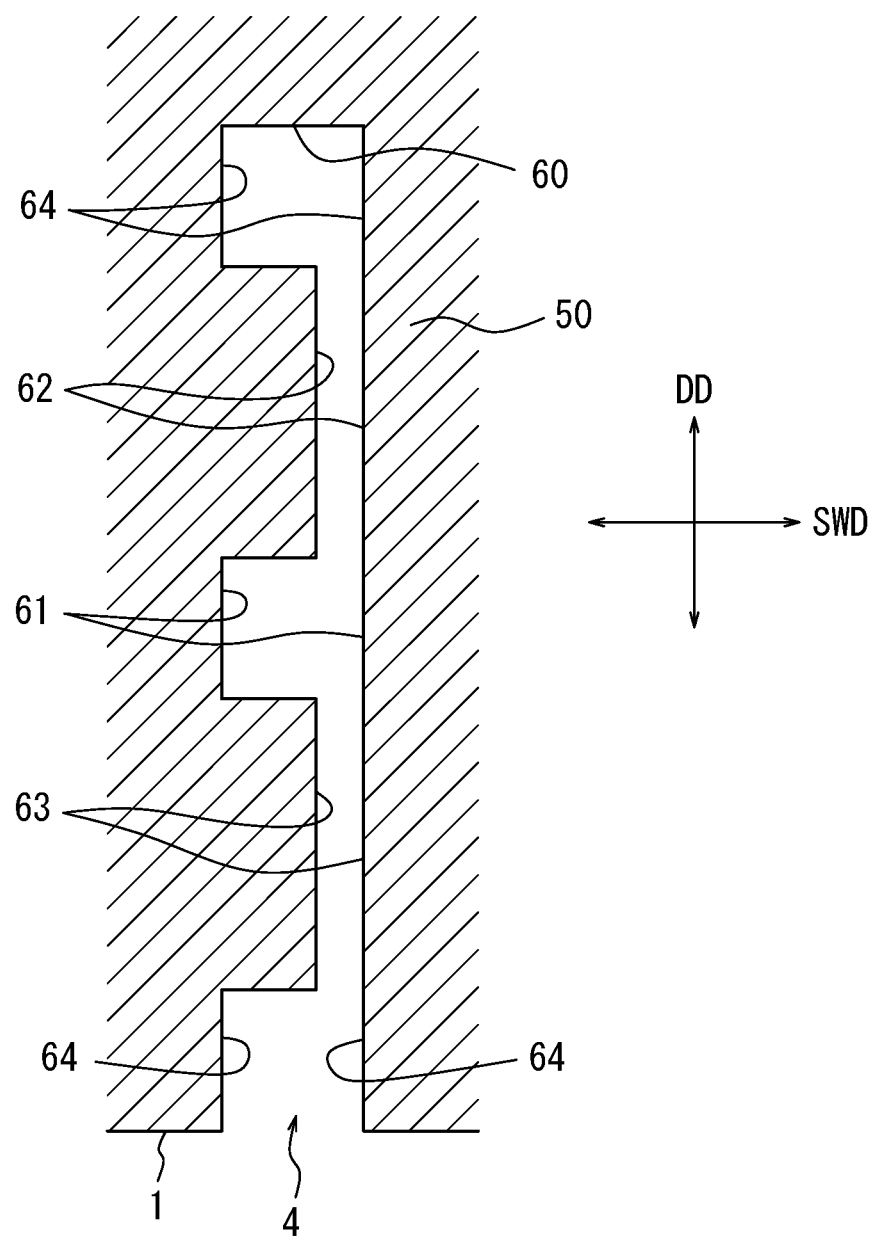

FIG. 10A
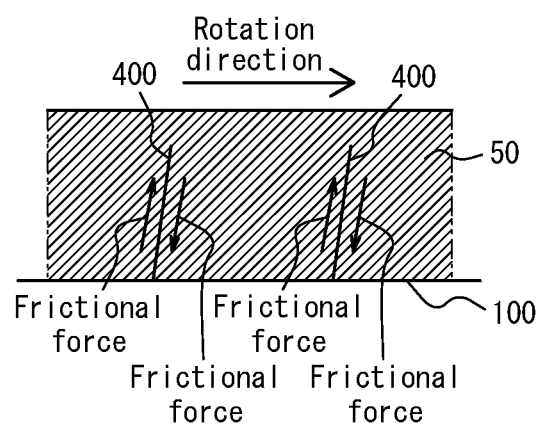
FIG. 10B
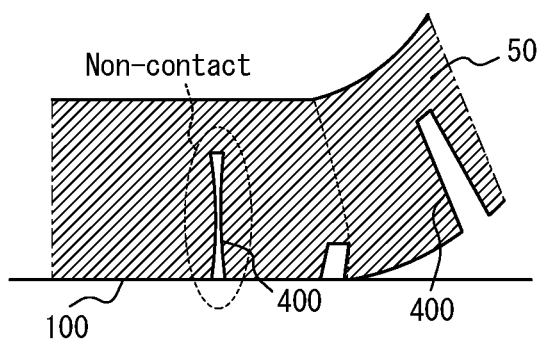
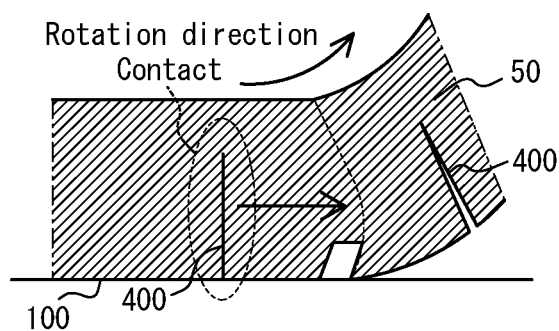

PNEUMATIC TIRE

TECHNICAL FIELD

This disclosure relates to a pneumatic tire.

The present application claims the priority based on Japanese Patent Application No. 2015-065131 filed on Mar. 26, 2015, and Japanese Patent Application No. 2015-177792 filed on Sep. 9, 2015, the entire contents of which are incorporated herein by reference.

BACKGROUND

Conventionally, there has been proposed a technology which, by optimizing a shape and an arrangement of a block land portion, reduces shear force generated in tread rubber at the time of kicking-out and suppressing a slipping phenomenon of the tread rubber on a road surface, thereby improving wear resistance (e.g., PLT 1).

CITATION LIST

Patent Literature

PTL1: JP2010-125977A

SUMMARY

Technical Problem

Incidentally, when a sipe is provided to the tread surface, wear resistance of a tire is greatly affected by a design of the sipe. This will be described in more detail with reference to FIGS. 10A and 10B. In FIGS. 10A and 10B, the tread surface 100 side is the lower side, and the sipe bottom side of the sipe 400 is the upper side.

First, as illustrated in FIG. 10A, when a vertical load is applied from directly above, the larger the frictional force generated between a pair of sipe wall surfaces facing each other in a sipe 400 when the sipe wall surfaces come into contact with each other, the higher the rigidity of a tread rubber 50, and thus the occurrence of wear may be suppressed. Therefore, in order to suppress the wear occurrence due to a decrease in the rigidity, a sipe width of the sipe 400 is preferably small.

However, when the sipe width of the sipe 400 is extremely small, at the time of subsequent kicking-out, as illustrated on the right side of FIG. 10A, the sipe wall surfaces still come into contact with each other. As a result, excessive shear force is generated in the tread rubber 50, and the wear is likely to occur. On the other hand, when the sipe width of the sipe 400 is sufficiently large, as illustrated in the left side of FIG. 10B, the sipe wall surfaces do not come into contact with each other at the time of the kicking-out. As a result, the tread rubber 50 may flow (inflate) into the sipe 400, the shear force of the tread rubber is reduced, suppressing the wear occurrence. Therefore, in order to suppress the wear occurrence due to the shear force at the time of the kicking-out, a sipe width of the sipe 400 is preferably large.

In order to suppress the wear occurrence at the time of the kicking-out, therefore, the sipe width of the sipe 400 is preferably large. However, when the sipe width of the sipe 400 is excessively large, upon application of the vertical load from directly above as described above, the sipe wall surfaces may not contact with each other, or the sipe wall surfaces may contact with each other without having sufficiently enhanced frictional force therebetween, thereby failing to sufficiently suppress the wear occurrence.

Therefore, in order to improve the wear resistance of the tire because of the design of the sipe, it is necessary to consider both the suppression of the wear occurrence due to the decrease in the rigidity and the suppression of the wear occurrence due to the shear force at the time of the kicking-out.

This disclosure aims to provide a pneumatic tire capable of improving the wear resistance performance.

Solution to Problem

The pneumatic tire of this disclosure is a pneumatic tire comprising a plurality of sipes on a tread surface, wherein: the plurality of sipes include a large intermediate width sipe having: a pair of intermediate sipe wall surface portions being located on an intermediate portion of the sipe in a tire radial direction, and facing each other at a constant spacing $t1$; a pair of bottom-side sipe wall surface portions being adjacent to the intermediate sipe wall surface portions on a sipe bottom side of the sipe, and facing each other at a constant spacing $t2$ smaller than the spacing $t1$ between the pair of intermediate sipe wall surface portions; and a pair of tread-surface-side sipe wall surface portions being adjacent to the intermediate sipe wall surface portions on the tread surface side, and facing each other at a constant spacing $t3$ smaller than the spacing $t1$ between the pair of intermediate sipe wall surface portions, and wherein: within a central region of the tread surface, a spacing along a tire circumferential direction between the large intermediate width sipe and another sipe or groove adjacent to the large intermediate width sipe in the tire circumferential direction is 2.0 to 4.0 times of a sipe depth D of the large intermediate width sipe.

According to the pneumatic tire of this disclosure, wear resistance may be improved.

Here, the "tread surface" refers to the outer circumferential surface, around the whole circumference of the tire, that contacts with the road surface when the tire is rotated after mounting on an applicable rim with specified air pressure and a load corresponding to the maximum load capability applied. Here, the "applicable rim" is a valid industrial standard for the region in which the tire is produced or used, and refers to an approved rim of an applicable size (the "Measuring Rim" in the STANDARDS MANUAL of ETRTO (the European Tyre and Rim Technical Organization in Europe), and the "Design Rim" in the "YEAR BOOK" of TRA (the Tire and Rim Association, Inc.)) according to the "JATMA Year Book" of the JATMA (Japan Automobile Tire Manufacturers Association) in Japan, the "STANDARDS MANUAL" of ETRTO in Europe, or the "YEAR BOOK" of TRA in the United States of America. Moreover, the "prescribed internal pressure" refers to an air pressure in accordance with the maximum load capability corresponding to the maximum load capability of the applicable size/ply rating described by the aforementioned JATMA, etc. The "maximum load capability" refers to the maximum mass that the tire is allowed to bear according to the aforementioned standards.

Moreover, the "sipe depth" described above a distance in a cross section of the sipe along a sipe width direction from a sipe opening position opening to the tread surface to a sipe bottom position along a tire radial direction.

Moreover, in the present Specification, as long as not specifically limited, the dimensions such as "spacing", "sipe width" and "sipe depth" refer to dimensions in a tire applied with no load.

In the pneumatic tire of this disclosure, the large intermediate width sipe may be configured such that each of the spacing t2 between the pair of bottom-side sipe wall surface portions and the spacing t3 between the pair of tread-surface-side sipe wall surface portions is 0.3 to 0.75 times of the spacing t1 between the pair of intermediate sipe wall surface portions.

Thereby, the wear resistance may be further improved.

In the pneumatic tire of this disclosure, the large intermediate width sipe may be configured such that each of a length W2 of the pair of bottom-side sipe wall surface portions along a longitudinal direction of the large intermediate width sipe and a length W3 of the pair of tread-surface-side sipe wall surface portions along the longitudinal direction of the large intermediate width sipe is 0.7 to 1.0 times of a length W0 of the large intermediate width sipe along the longitudinal direction of the large intermediate width sipe.

Thereby, the wear resistance may be further improved.

Here, the "longitudinal direction of the large intermediate width sipe" refers to a direction along a sipe widthwise central line of the large intermediate width sipe when a developed view of the tread surface is viewed in plan.

In the pneumatic tire of this disclosure, the large intermediate width sipe may be configured such that a length b of the pair of intermediate sipe wall surface portions along the tire radial direction is 0.1 to 0.3 times of the sipe depth D of the large intermediate width sipe; and a central position of the pair of intermediate sipe wall surface portions in the tire radial direction matches a central position of the large intermediate width sipe in the tire radial direction.

Thereby, the wear resistance may be further improved.

In the pneumatic tire of this disclosure, the large intermediate width sipe may be configured such that with the sipe depth of the large intermediate width sipe being D, and the length of the pair of intermediate sipe wall surface portions along the tire radial direction being b, each of a length a of the pair of bottom-side sipe wall surface portions and a length c of the pair of tread-surface-side sipe wall surface portions along the tire radial direction is (D−b)/2 or less.

Thereby, the wear resistance may be further improved.

In the pneumatic tire of this disclosure, the plurality of sipes may be configured as further including a constant width sipe having a pair of sipe wall surfaces, the pair of sipe wall surfaces extending across an entire sipe depth and facing each other at a constant spacing; the large intermediate width sipe is arranged only within the central region of the tread surface, each of the pair of intermediate sipe wall surface portions, the pair of bottom-side sipe wall surface portions and the pair of tread-surface-side sipe wall surface portions of the large intermediate width sipe being flat and extending in the same planar direction with each other; the constant width sipe is arranged only within a shoulder region located on a tire widthwise side outer than the central region on the tread surface, each of the pair of sipe wall surfaces of the constant width sipe being flat; and a sipe width of the constant width sipe is smaller than an average value of a maximum value and a minimum value of a sipe width of the large intermediate width sipe.

Thereby, uneven wear is unlikely to occur.

The pneumatic tire of this disclosure has a specified tire mounting direction relative to the vehicle, such that the constant width sipe is arranged only within the shoulder region on a vehicle mounting direction inner side on the tread surface, and the shoulder region on a vehicle mounting direction outer side on the tread surface may be provided with no sipes.

Thereby, the steering stability during cornering may be improved.

Note that in the present Specification, the "sipe" refers to a narrow groove with a maximum value of a groove width (sipe width) of about 1 mm or less.

In the pneumatic tire of this disclosure, a spacing along the tire circumferential direction between the constant width sipe arranged within the shoulder region of the tread surface and another sipe or groove adjacent to the constant width sipe in the tire circumferential direction may be 0.8 to 1.2 times of a spacing along the tire circumferential direction between the large intermediate width sipe arranged within the central region of the tread surface and another sipe or groove adjacent to the large intermediate width sipe in the tire circumferential direction.

Thereby, uneven wear is more unlikely to occur.

Advantageous Effect

According to the disclosure herein, a pneumatic tire capable of improving wear resistance may be provided.

BRIEF DESCRIPTION OF THE DRAWINGS

In the accompanying drawings:

FIG. 2A is a perspective view, FIG. 2B is a cross-sectional view along the 2B-2B line in FIG. 2A, and FIG. 2C is a cross-sectional view along the 2C-2C line in FIG. 2A;

FIGS. 3A to 3C illustrate the second example for the large intermediate width sipe used in one embodiment of the pneumatic tire of this disclosure, where FIG. 3A is a perspective view, FIG. 3B is a cross-sectional view along the 3B-3B line in FIG. 3A, and FIG. 3C is a cross-sectional view along the 3C-3C line in FIG. 3A;

FIG. 4A is a perspective view, FIG. 4B is a cross-sectional view along the 4B-4B line in FIG. 4A, and FIG. 4C is a cross-sectional view along the 4C-4C line in FIG. 4A;

FIGS. 5A to 5C illustrate the fourth example for the large intermediate width sipe used in one embodiment of the pneumatic tire of this disclosure, where FIG. 5A is a perspective view, FIG. 5B is a cross-sectional view along the 5B-5B line in FIG. 5A, and FIG. 5C is a cross-sectional view along the 5C-5C line in FIG. 5A;

FIG. 6 illustrates a cross-sectional view of along the sipe width direction, which shows the fifth example for the large intermediate width sipe used in one embodiment of the pneumatic tire of this disclosure;

FIGS. 10A and 10B describe the affect of the design of the sipe to the wear resistance performance.

DETAILED DESCRIPTION

Embodiments of this disclosure are described below with reference to the accompanying drawings.

Referring to FIG. 1 and FIGS. 2A to 2C, one embodiment of a pneumatic tire (hereinafter, also simply referred to as a "tire") of this disclosure will be described. Note that the tire of the present embodiment is preferably used as a passenger vehicle pneumatic tire, in particular, a general tire (a summer tire or an all-season tire) non-specialized for ice or snow.

Figure 1:
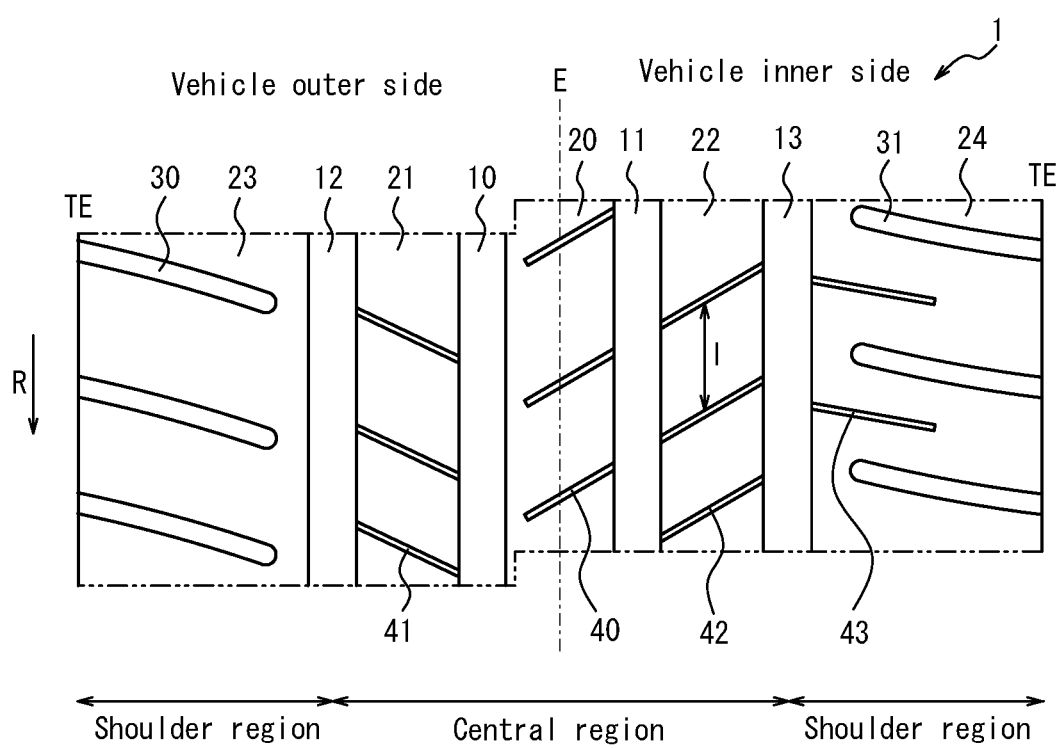
FIG. 1 illustrates a partial development view of a tread pattern of the pneumatic tire according to one embodiment of this disclosure.

FIG. 1 illustrates an example for the tread surface 1 of the tire of the present embodiment. The tire in the example of FIG. 1 is preferably used with one side (a lower side in FIG. 1) in the tire circumferential direction as a front side of a rotational direction R. However, the tire of the present embodiment may suitably use either side in the tire circumferential direction as the front side of the rotational direction R.

Moreover, the pneumatic tire of the example of FIG. 1 has a specified tire mounting direction relative to the vehicle, such that the left side to the tire equatorial plane E in FIG. 1 is a vehicle mounting direction outer side, and the right side to the tire equatorial plane E in FIG. 1 is a vehicle mounting direction inner side. The tire of the present embodiment may also be one without a specified tire mounting direction relative to the vehicle.

The tread surface 1 is provided with, in the central region thereof, a total of four circumferential grooves 10 to 13 along the tire circumferential direction in such a manner that two each thereof are provided on either side of a tire equatorial plane E.

Note that the "central region" refers to a tire width direction region which, with the tire equatorial plane E in the center thereof, accounts for approximately 52% of the tire width direction between tread ground contact edges TE on both sides of the tire width direction.

In the central region of the tread surface 1, the two circumferential grooves 10 and 11 adjacent to each other in the tire width direction across the tire equatorial plane E form a rib-like center land portion 20 which spans across the tire equatorial plane E. The rib-like center land portion 20 is provided with a plurality of sipes 40 substantially parallel to each other and spaced apart from each other along the tire circumferential direction. These sipes 40 extend substantially linearly in a direction intersecting both the tire circumferential direction and the tire width direction and have one end opening to the circumferential groove 11, which is one of the two circumferential grooves forming the rib-like center land portion 20, and the other end positioned within the rib-like center land portion 20 between the tire equatorial plane E and the circumferential groove 10, which is the other one of the two circumferential grooves forming the rib-like center land portion 20.

Further, in the central region of the tread surface 1, a rib-like center land portion 21 is formed by the circumferential groove 10 adjacent to the circumferential groove 11 in the tire width direction across the tire equatorial plane E and the circumferential groove 12 positioned outside the circumferential groove 10 in the tire width direction, and a rib-like center land portion 22 is formed by the circumferential groove 11 adjacent to the circumferential groove 10 in the tire width direction across the tire equatorial plane E and the circumferential groove 13 positioned outside the circumferential groove 11 in the tire width direction. The rib-like center land portions 21 and 22 are provided with a plurality of sipes 41 and a plurality of sipes 42, respectively. The sipes 41 are spaced apart from each other and approximately parallel to each other along the tire circumferential direction, and so are the sipes 42. These sipes 41 and 42 substantially linearly extend in a direction intersecting both the tire circumferential direction and the tire width direction (in the example of FIG. 1, in a direction in which a portion of the sipe on a further inner side in the tire width direction locates on further front side of the tire rotational direction R). Each of the sipes 41 has one end opening to the circumferential groove 10, which is one of the grooves forming the rib-like center land portion 21, and the other end opening to the circumferential groove 12, which is the other groove forming the rib-like center land portion 21. Also, each of the sipes 42 has one end opening to the circumferential groove 11, which is one of the grooves forming the rib-like center land portion 22, and the other end opening to the circumferential groove 13, which is the other groove forming the rib-like center land portion 22.

On the other hand, in the tread surface 1, within a shoulder region outside the central region in the tire width direction, two circumferential grooves 12 and 13, located outermost in the tire width direction among the four circumferential grooves, and the tread ground contact edges TE form rib-like shoulder land portions 23 and 24, respectively. The rib-like shoulder land portion 23 is provided with a plurality of lug grooves 30 spaced apart from each other along the tire circumferential direction, and the rib-like shoulder land portion 24 is provided with a plurality of lug grooves 31 spaced apart from each other along the tire circumferential direction. The lug grooves 30 extend from the tread ground contact edge TE and terminate within the rib-like shoulder land portion 23 before reaching the circumferential groove 12 forming the rib-like shoulder land portion 23. Also, the lug grooves 31 extend from the tread ground contact edge TE and terminate within the rib-like shoulder land portion 24 before reaching the circumferential groove 13 forming the rib-like shoulder land portion 24. The rib-like shoulder land portion 24 on the vehicle mounting direction inner side is also provided with a plurality of sipes 43 apart from each other and approximately parallel to each other along the tire circumferential direction. These sipes 43 substantially linearly extend in a direction intersecting both the tire circumferential direction and the tire width direction (in the example of FIG. 1, in a direction in which a portion of the sipe on further outer side of the tire width direction locates on further front side of the tire rotational direction R). Each of the sipes 43 has one end opening to the circumferential groove 13 forming the rib-like shoulder land portion 24, and the other end terminating within the rib-like shoulder land portion 24 before reaching the tread ground contact edge TE. On the other hand, the rib-like shoulder land portion 23 on the vehicle mounting direction outer side is provided with no sipes.

Note that the "tread ground contact edge TE" refers to an outermost position of the tread surface 1 in the tire width direction.

In the example of FIG. 1, since the central region of the tread surface 1 includes the rib-like center land portions 20 to 22 between the circumferential grooves 10 to 13, as compared with a tread surface which is further provided with, for example, width direction grooves extending in a direction intersecting the tire circumferential direction and thus has block land portions formed by the circumferential grooves and the width direction grooves, the rigidity of the tread rubber 50 may be further enhanced, leading to the improvement in the wear resistance.

Note that, in the central region of the tread surface 1, a block land portion may be formed in place of the rib-like center land portion.

Note that the tread surface 1 of the tire of the present embodiment is not limited to that of the example of FIG. 1 but, as long as having a sipe extending in the direction intersecting the tire circumferential direction, may have any tread pattern.

Note that the sipe blade used for the formation of such sipe during vulcanization molding of the tire may be formed by, for example, press working or a 3D printer.

Figure 2A:
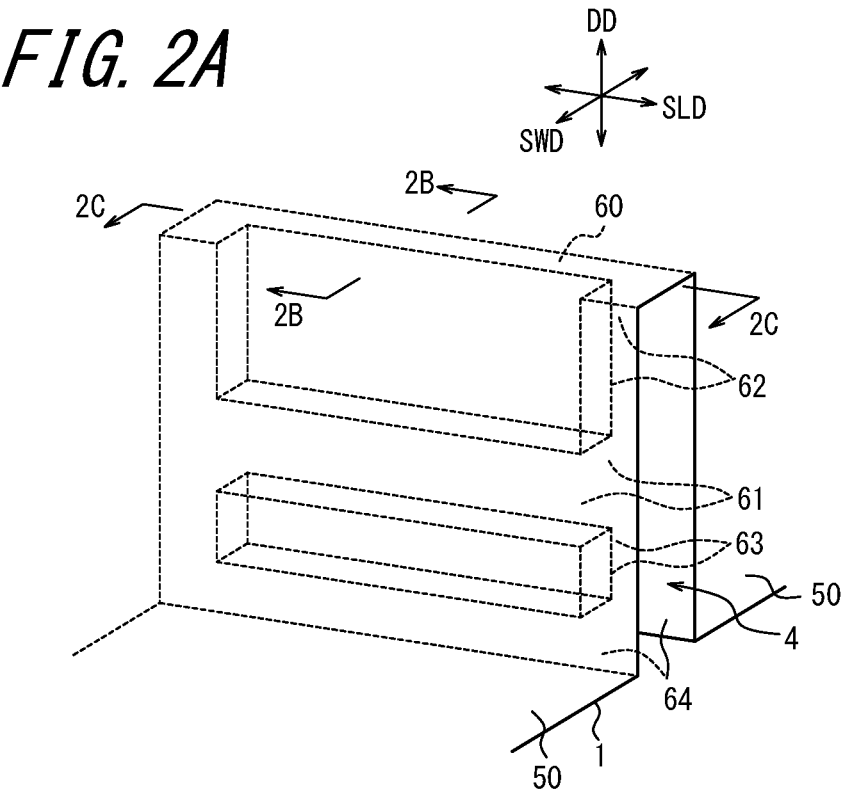
FIGS. 2A to 2C illustrate the first example for the large intermediate width sipe used in one embodiment of the pneumatic tire of this disclosure, where
Figures 2B, 2C:
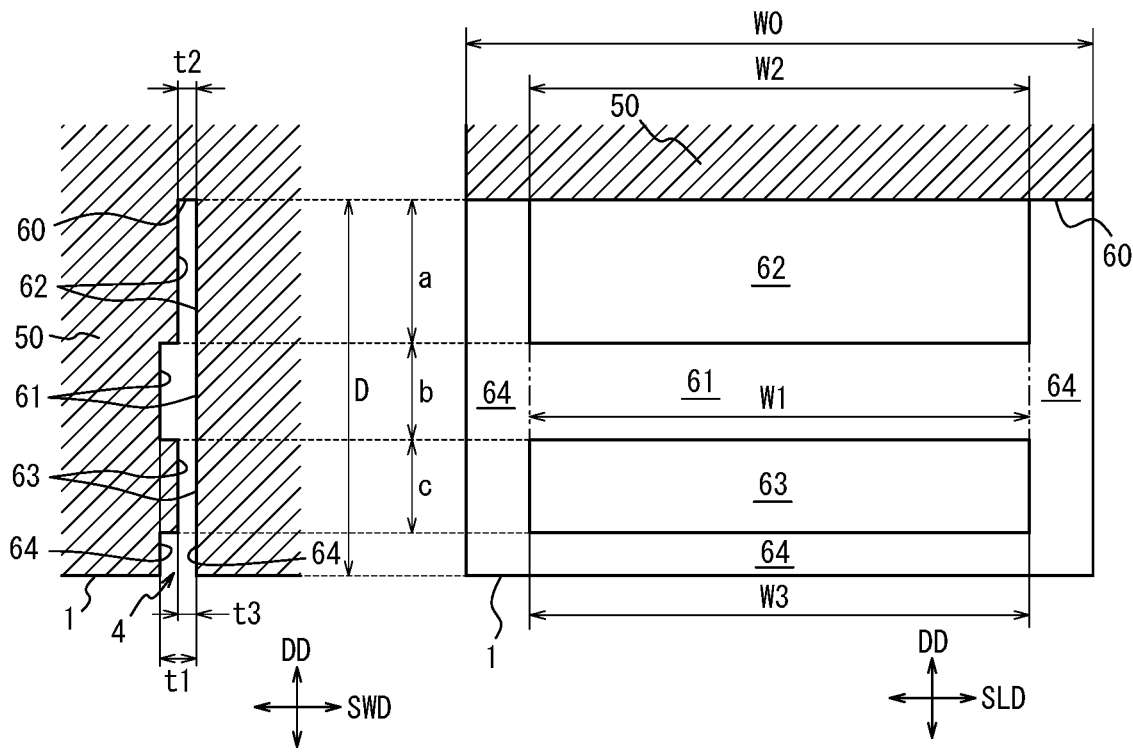

FIGS. 2A to 2C illustrate an example for a large intermediate width sipe 4 applicable to at least a part of sipes among the sipes 40 to 43 provided on the tread surface 1 in FIG. 1. FIG. 2A is a perspective view, FIG. 2B is a cross-sectional view in the sipe width direction SWD along the 2B-2B line in FIG. 2A, and FIG. 2C is a cross-sectional view in the sipe longitudinal direction SLD along the 2C-2C line in FIG. 2A. Note that in FIG. 2A to FIG. 2c, the tread surface 1 side is referred to as the lower side, and the sipe bottom 60 side of the large intermediate width sipe 4 is referred to as the upper side.

In the present embodiment, a pair of sipe wall surfaces facing each other of the large intermediate width sipe 4 have: a pair of intermediate sipe wall surface portions 61 being located on an intermediate portion of the large intermediate width sipe 4 in a tire radial direction DD, and facing each other at a constant spacing t1; a pair of bottom-side sipe wall surface portions 62 being adjacent to the intermediate sipe wall surface portions 61 on the sipe bottom 60 side of the sipe, and facing each other at a constant spacing t2 smaller than the spacing t1 between the pair of intermediate sipe wall surface portions 61 (t2<t1); and a pair of tread-surface-side sipe wall surface portions 63 being adjacent to the intermediate sipe wall surface portions 61 on the tread surface 1 side, and facing each other at a constant spacing t3 smaller than the spacing t1 between the pair of intermediate sipe wall surface portions (t3<t1).

Namely, in the present embodiment, the sipe width of the large intermediate width sipe 4 (the spacing between the pair of wall surfaces facing each other in a virtual plane perpendicular to the longitudinal direction SLD of the large intermediate width sipe 4) is set larger on the intermediate portion of the large intermediate width sipe 4 in the tire radial direction DD, and is set smaller on both sides in the tire radial direction DD of the intermediate portion of the large intermediate width sipe 4.

It is preferable that the sipe width of the large intermediate width sipe 4 is set such that, at the time of application of the load from directly above, it allows contact (or closure) between the pair of bottom-side sipe wall surface portions 62 and between the pair of tread-surface-side sipe wall surface portions 63, respectively, but does not allow contact between the pair of intermediate sipe wall surface portions 61.

According to such design of the large intermediate width sipe 4, at the time of application of the load from directly above, when the pair of sipe wall surfaces facing each other of the large intermediate width sipe 4 come into contact with each other, the frictional force between the sipe wall surfaces is particularly increased between the pair of bottom-side sipe wall surface portions 62 and between the pair of tread-surface-side sipe wall surface portions 63, which have a small sipe width. Therefore, it is possible to enhance the rigidity of the tread rubber 50, and to thereby suppress the wear occurrence. In this way, the pair of bottom-side sipe wall surface portions 62 and the pair of tread-surface-side sipe wall surface portions 63, which form a comparatively small sipe width, contribute to enhancement of the frictional force between the sipe wall surfaces at the time of application of the load from directly above, and even to suppression of the wear occurrence.

Further, according to such design of the large intermediate width sipe 4, at the time of kicking-out, since the tread rubber 50 is allowed to flow (inflate) between the pair of intermediate sipe wall surface portions, which have a large sipe width, in the large intermediate width sipe 4, the shear force of the tread rubber is reduced, suppressing the wear occurrence. In this way, the pair of intermediate sipe wall surface portions 61, which form a comparatively large sipe width, contribute to increase of the inflow (inflation) amount of the tread rubber 50 into the large intermediate width sipe 4 at the time of kicking-out, and even to suppression of the wear occurrence.

Therefore, in the tire of the present embodiment, since both at the time of application of the load from directly above and at the time of the kicking-out, the wear may be suppressed, and thus the wear resistance may be improved.

Note that the inflow (inflation) of the tread rubber 50 into the large intermediate width sipe 4 at the time of kicking-out is the most likely to occur at the intermediate position of the large intermediate width sipe 4 in the tire radial direction DD. Therefore, by arranging the pair of intermediate sipe wall surface portions 61 forming a large sipe width on such position, it is possible to increase the inflow (inflation) amount of the tread rubber 50 into the large intermediate width sipe 4 at the time of kicking-out, and to reduce the shear force of the tread rubber 50.

In the present embodiment, the large intermediate width sipe 4 is applied as at least a part of the sipes 40 to 42 within the central region of the tread surface 1 in FIG. 1. Further, within the central region, the spacing 1 along the tire circumferential direction (FIG. 1) between the large intermediate width sipe 4 and another sipe being adjacent to such large intermediate width sipe 4 in the tire circumferential direction and extending in a direction crossing the tire circumferential direction (i.e., another large intermediate width sipe 4 or a sipe of another design) is set to 2.0 to 4.0 times of the sipe depth D of such large intermediate width sipe 4. This configuration further improves the wear resistance.

Note that, for example, when the central region, in a different manner from the example of FIG. 1, is provided with grooves extending in the direction intersecting the tire circumferential direction in addition to the large intermediate width sipe 4, a spacing 1 along the tire circumferential direction between the large intermediate width sipe 4 and the groove adjacent thereto in the tire circumferential direction is 2.0 to 4.0 times of the sipe depth D of the large intermediate width sipe 4 in the central region.

If the aforementioned spacing is less than 2.0 times of the sipe depth D of the large intermediate width sipe 4, a land portion partitioned by the large intermediate width sipe 4 and the other sipe or groove may not secure sufficient rigidity, leading to insufficient improvement in the wear resistance. On the other hand, when the spacing described above is larger than 4.0 times of the sipe depth of the large intermediate width sipe 4, there is a risk that performance other than the wear resistance such as wet performance, steering stability, and the like is not sufficiently secured.

Here, the spacing 1 between the large intermediate width sipe 4 and the other sipe or groove adjacent thereto along the tire circumferential direction refers to a spacing between the large intermediate width sipe 4 and the other sipe or groove when viewed from a virtual straight line in the tire circumferential direction intersecting both the large intermediate width sipe 4 and the other sipe or groove. In the tread surface 1, in the case where the large intermediate width sipe 4 and the other sipe or groove are not parallel to each other, the spacing 1 varies along the large intermediate width sipe 4. In this case as well, the spacing 1 may be any one as long as it is 2.0 to 4.0 times of the sipe depth D of the large intermediate width sipe 4.

Moreover, in calculating a ratio of the spacing to the sipe depth D described above, when a plurality of large intermediate width sipe 4 provided on the tread surface 1 have different sipe depths D, the deepest sipe depth among the sipe depths is used as the "sipe depth" of the large intermediate width sipe 4. Also, when the sipe depth varies within the large intermediate width sipe 4 along the extending direction SLD thereof, a maximum value of the sipe depth of the large intermediate width sipe 4 is used as the "sipe depth D". In the example of FIGS. 2A to 2C, the large intermediate width sipe 4 has a constant sipe depth along the extending direction SLD thereof.

Within the shoulder region of the tread surface 1, it is preferable that a spacing along the tire circumferential direction between a pair of sipes 43 adjacent in the tire circumferential direction is set to 2.0 to 4.0 times of the sipe depth D of the sipe 43. Thereby, the wear resistance may be further improved. In this case, the large intermediate width sipe 4 may be applied as at least a part of the sipes 43 within the shoulder region.

Note that the spacing along the tire circumferential direction between the pair of sipes 43 adjacent in the tire circumferential direction refers to a spacing between the pair of sipes 43 when viewed from a virtual straight line in the tire circumferential direction intersecting the pair of sipes 43.

Back to FIGS. 2A to 2C, it is preferable that each of the spacing t2 between the pair of bottom-side sipe wall surface portions 62 and the spacing t3 between the pair of tread-surface-side sipe wall surface portions 63 is 0.3 to 0.75 times of the spacing t1 between the pair of intermediate sipe wall surface portions 61 (0.3≤t2/t1≤0.75, and 0.3≤t3/t1≤0.75). Thereby, both the function of wear occurrence suppression at the time of application of the load from directly above due to the pair of bottom-side sipe wall surface portions 62 and the pair of tread-surface-side sipe wall surface portions 63, and the function of wear occurrence suppression at the time of kicking-out due to the pair of intermediate sipe wall surface portions 61 may be exhibited effectively, and thus it is possible to further improve the wear resistance performance.

Note that in the example of FIGS. 2A to 2C, the spacing t2 between the pair of bottom-side sipe wall surface portions 62 and the spacing t3 between the pair of tread-surface-side sipe wall surface portions 63 are identical to each other (t2=t3), but may be different from each other as well.

Moreover, it is preferable that each of the length W2 of the pair of bottom-side sipe wall surface portions 62 along the longitudinal direction SLD of the large intermediate width sipe 4 and the length W3 of the pair of tread-surface-side sipe wall surface portions 63 along the longitudinal direction SLD of the large intermediate width sipe 4 is 0.7 to 1.0 times of the length W0 of the large intermediate width sipe 4 along the longitudinal direction SLD of the large intermediate width sipe 4 (0.7≤W2/W0≤1.0, and 0.7≤W3/W0≤1.0).

Thereby, the area of both the pair of bottom-side sipe wall surface portions 62 and the pair of tread-surface-side sipe wall surface portions 63 may be ensured sufficiently, and thus their function of wear occurrence suppression at the time of application of the load from directly above may be exhibited more effectively, thereby further improving the wear resistance performance.

Note that in the example of FIGS. 2A to 2C, the length W2 of the pair of bottom-side sipe wall surface portions 62 along the longitudinal direction SLD of the large intermediate width sipe 4 and the length W3 of the pair of tread-surface-side sipe wall surface portions 63 along the longitudinal direction SLD of the large intermediate width sipe 4 may be either identical to each other (W2=W3), but may be different from each other as well.

Moreover, it is preferable that the length b of the pair of intermediate sipe wall surface portions 61 along the tire radial direction DD is 0.1 to 0.3 times of the sipe depth D of the large intermediate width sipe 4 (0.1≤b/D≤0.3). Thereby, by sufficiently ensuring the area of the pair of intermediate sipe wall surface portions 61, it is possible to sufficiently exhibit the function of wear occurrence suppression at the time of kicking-out due to the pair of intermediate sipe wall surface portions 61. Also, it is possible to sufficiently ensure the area of both the pair of bottom-side sipe wall surface portions 62 and the pair of tread-surface-side sipe wall surface portions 63, and to thereby sufficiently exhibit their function of wear occurrence suppression at the time of application of the load from directly above, thereby further improving the wear resistance performance.

Further, it is preferable that the central position of the pair of intermediate sipe wall surface portions 61 in the tire radial direction DD matches the central position of the large intermediate width sipe 4 in the tire radial direction DD. Thereby, by arranging the pair of intermediate sipe wall surface portions 61 at a position at which inflow (inflation) of the tread rubber 50 into the large intermediate width sipe 4 is the most likely to occur at the time of kicking-out, the inflow (inflation) amount of the tread rubber 50 into the large intermediate width sipe 4 at the time of kicking-out is increased, which enables further suppression of the wear occurrence at the time of kicking-out.

Moreover, it is preferable that with the sipe depth of the large intermediate width sipe 4 being D, and the length of the pair of intermediate sipe wall surface portions 61 along the tire radial direction DD being b, each of the length a of the pair of bottom-side sipe wall surface portions 62 and the length c of the pair of tread-surface-side sipe wall surface portions 63 along the tire radial direction DD is (D−b)/2 or less (a≤(D−b)/2, and/or c≤(D−b)/2). Thereby, it is possible to sufficiently ensure the area of both the pair of bottom-side sipe wall surface portions 62 and the pair of tread-surface-side sipe wall surface portions 63, and to simultaneously arrange the pair of intermediate sipe wall surface portions 61 at an optimal position in the tire radial direction DD, which enables further suppression of the wear occurrence at the time of application of the load from directly above and at the time of kicking-out.

Moreover, from the same viewpoint, it is preferable that each of the length a of the pair of bottom-side sipe wall surface portions 62 and the length c of the pair of tread-surface-side sipe wall surface portions 63 along the tire radial direction DD is D/10 or more (D/10≤a, and/or D/10≤c).

It is preferable that the sipe depth D of the large intermediate width sipe 4 is 0.75 to 1 times of a maximum depth of grooves provided on the tread surface 1 (in the example in FIG. 1, the circumferential grooves 10 to 13). Thereby, by sufficiently ensuring the sipe depth D of the large intermediate width sipe 4, as compared to the case of a shallower sipe depth D of the large intermediate width sipe 4, the large intermediate width sipe 4 opens easily at the time of kicking-out, and the strain of the tread rubber 50 may be reduced. Therefore, the wear occurrence at the time of kicking-out may be further suppressed.

In the example of FIGS. 2A to 2C, the pair of sipe wall surfaces facing each other of the large intermediate width sipe 4 further have a pair of outer end sipe wall surface portions 64 extending across an entire length in the depth direction DD of the large intermediate width sipe 4 on ends of both sides in the longitudinal direction SLD of the large intermediate width sipe 4, extending across the entire length in the longitudinal direction SLD of the large intermediate width sipe 4 on an end on the tread surface 1 side of the large intermediate width sipe 4, and facing each other at a spacing the same as the spacing t1 between the pair of intermediate sipe wall surface portions 61. The pair of outer end sipe wall surface portions 64 are adjacent to the pair of bottom-side sipe wall surface portions 62, the pair of intermediate sipe wall surface portions 61 and the pair of tread-surface-side sipe wall surface portions 63, on the outer sides in the longitudinal direction SLD of the large intermediate width sipe 4 on both sides in the longitudinal direction SLD of the large intermediate width sipe 4, and are adjacent to the pair of tread-surface-side sipe wall surface portions 63 on the tread surface 1 side.

In this way, by providing a pair of outer end sipe wall surface portions 64 forming a comparatively large sipe width, a rigidity of a sipe blade used in formation of the large intermediate width sipe 4 may be improved, which is preferable the viewpoint of production of the large intermediate width sipe 4.

Moreover, according to the present embodiment, by arranging the pair of outer end sipe wall surface portions 64 forming a comparatively large sipe width on the end on the tread surface 1 side of the large intermediate width sipe 4, the function of the large intermediate width sipe 4 of absorbing water and cutting a water film on the road surface at the time of running on a wet road surface may be improved, thereby improving the wet performance.

Note that, since the end on the tread surface 1 side of the large intermediate width sipe 4 is intrinsically not a position at which a large friction occurs between the wall surfaces of the large intermediate width sipe at the time of application of the load from directly above, even if the pair of outer end sipe wall surface portions 64 forming a comparatively large sipe width is arranged according to the present embodiment, there is no risk of significant reduction in the friction between the wall surfaces of the large intermediate width sipe 4 at the time of application of the load from directly above, or even marked deterioration of the function of suppressing the wear occurrence.

The pair of outer end sipe wall surface portions 64 may be not provided, or may be provided only on the end on one side or the ends on both sides in the longitudinal direction SLD of the large intermediate width sipe 4, or provided only on the end on the tread surface 1 side of the large intermediate width sipe 4.

In the example of FIGS. 2A to 2C, each of the pair of intermediate sipe wall surface portions 61, the pair of bottom-side sipe wall surface portions 62 and the pair of tread-surface-side sipe wall surface portions 63 is formed into a flat shape without being bent or curved, and extends along the same planar direction (in the present embodiment, a direction of a virtual plane inclusive of approximately the tire radial direction DD and the longitudinal direction SLD of the large intermediate width sipe 4) with each other. Further, the pair of intermediate sipe wall surface portions 61, the pair of bottom-side sipe wall surface portions 62 and the pair of tread-surface-side sipe wall surface portions 63 are respectively parallel to each other. Thereby, a large contact area between the pair of intermediate sipe wall surface portions 61, the pair of bottom-side sipe wall surface portions 62 and the pair of tread-surface-side sipe wall surface portions 63 may be ensured respectively at the time of application of the load from directly above, and thus it is possible to enhance the frictional force between the sipe wall surfaces and further suppress the wear occurrence at the time of application of the load from directly above.

Preferably from the viewpoint of improving the wear resistance performance, the pair of intermediate sipe wall surface portions 61, the pair of bottom-side sipe wall surface portions 62 and the pair of tread-surface-side sipe wall surface portions 63 may respectively extend along one planar direction inclined with respect to the tire radial direction DD, in particular, a planar direction inclined with respect to the tire radial direction DD in a direction in which a portion of the sipe on a further inner side in the tire radial direction DD locates on further front side of the tire rotational direction R.

Moreover, each of the pair of intermediate sipe wall surface portions 61, the pair of bottom-side sipe wall surface portions 62 and the pair of tread-surface-side sipe wall surface portions 63 may have one or more positions bent or curved as long as the sipe width formed by each is constant.

Moreover, the pair of intermediate sipe wall surface portions 61, the pair of bottom-side sipe wall surface portions 62 and/or the pair of tread-surface-side sipe wall surface portions 63 may be provided with fine recesses and projections, to thereby enhance the frictional force between the sipe wall surfaces at the time of application of the load from directly above.

In the example of FIGS. 2A to 2C, the sipe depth D of the large intermediate width sipe 4 is constant across the entire length in the longitudinal direction of the large intermediate width sipe 4. Namely, the sipe bottom 60 of the large intermediate width sipe 4 is provided with no raised bottom portions. Thereby, a large contact area between the pair of bottom-side sipe wall surface portions 62 may be ensured, which enables enhancement of the frictional force between the sipe wall surfaces at the time of application of the load from directly above, and further suppression of the wear occurrence.

The sipe bottom 60 of the large intermediate width sipe 4 may be provided with a raised bottom portion across a part in the longitudinal direction of the large intermediate width sipe 4.

As mentioned above, the large intermediate width sipe 4 is arranged at least within the central region, which affords a highest ground contact pressure among the tread surface 1. Thereby, the wear resistance performance may be improved more securely. Note that the central region may be provided with, in addition to the large intermediate width sipe 4, a sipe of a design different from the large intermediate width sipe 4.

On the other hand, the shoulder region may be either provided with the large intermediate width sipe 4 or not. Moreover, the shoulder region may be provided with a sipe of a design different from the large intermediate width sipe 4 (e.g., a constant width sipe having a pair of sipe wall surfaces extending across the entire sipe depth, and facing each other at a constant spacing, etc.), to thereby further enhance the frictional force between the sipe wall surfaces at the time of application of the load from directly above.

Figure 7:
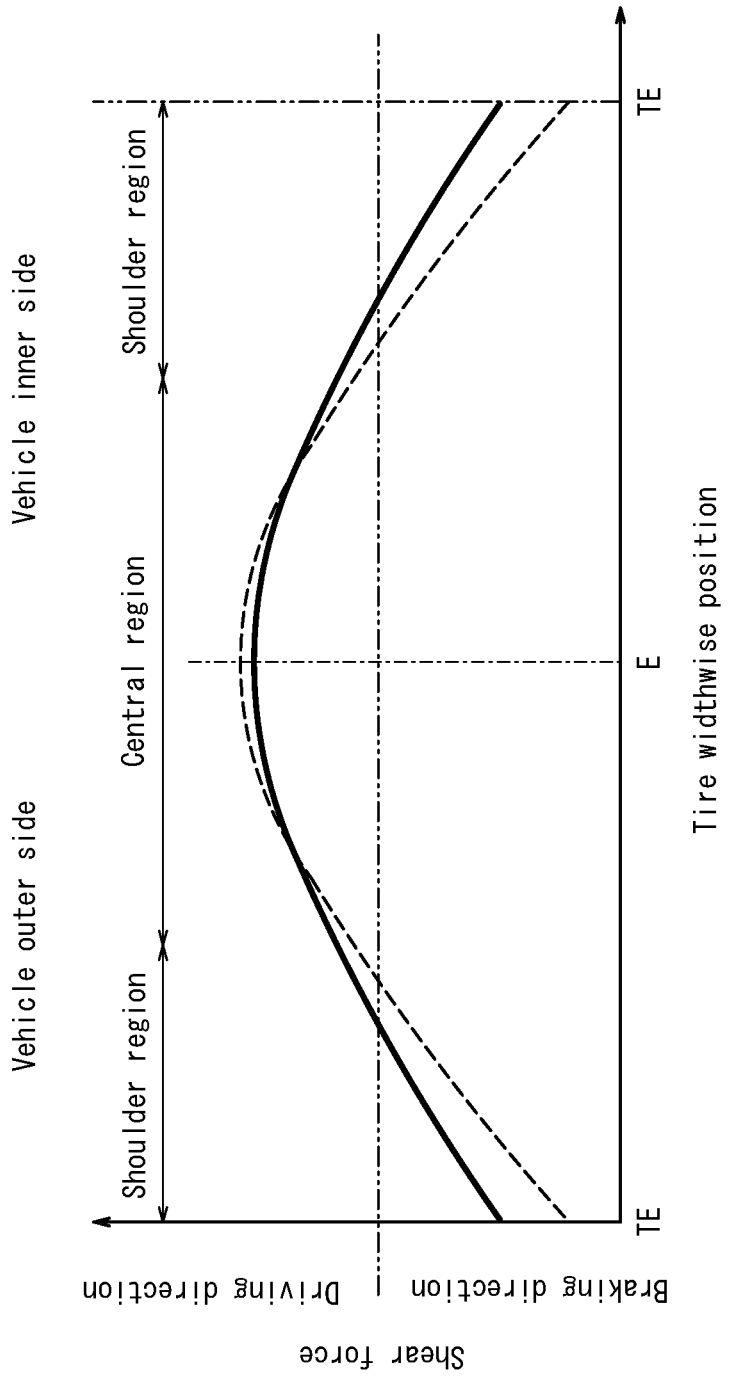
FIG. 7 describes the shear force acting on the tread rubber.

FIG. 7 illustrates a distribution along the tire width direction of a tire circumferential direction shear force acting on the tread rubber at the time of kicking-out in a pneumatic tire having the tread pattern of FIG. 1. Usually, a tire has a tire outer diameter larger within the central region than within the shoulder region. Due to such difference in outer diameter, the circumferential direction shear force acting on the tread rubber at the time of kicking-out tends to increase along the driving direction (proceeding direction) within the central region, and to increase in the braking direction (the direction opposite to the proceeding direction) within the shoulder region.

If all the sipes 40 to 43 within the tread surface 1 in FIG. 1 are designed as constant width sipes, the sipe wall surfaces of the sipes are likely to contact each other at the time of kicking-out within the central region as compared to the shoulder region. As a result, as illustrated with dashed line in FIG. 7, the shear force in the driving direction within the central region is increased, and friction is likely to occur in the central region as compared to the shoulder region.

Then, it is preferable that the large intermediate width sipe 4 is applied only as the sipes 40 to 42 within the central region, and the constant width sipe is applied only as the sipe 43 within the shoulder region. In this case, it is preferable that each of the pair of sipe wall surfaces facing each other of the constant width sipe is flat across the entire sipe depth of the constant width sipe. Moreover, in this case, it is preferable that the sipe width of the constant width sipe is set smaller than the average value of the maximum value (in each aforementioned example, the spacing t1 between the pair of intermediate sipe wall surface portions 61) and the minimum value (in each aforementioned example, a smaller one among the spacing t2 between the pair of bottom-side sipe wall surface portions 62 and the spacing t3 between the pair of tread-surface-side sipe wall surface portions 63) of the sipe width of the large intermediate width sipe 4. The distribution of the circumferential direction shear force in this case is as illustrated with solid line in FIG. 7.

By designing the sipes 40 to 42 within the central region as the large intermediate width sipe 4, as mentioned above, it is possible to improve the wear resistance performance within the central region, and to simultaneously reduce the circumferential direction shear force in the driving direction. Moreover, by designing the sipe 43 within the shoulder region as the thin, flat constant width sipe as mentioned above, the shear force in the braking direction within the shoulder region may be reduced. Thereby, the tire widthwise distribution of the circumferential direction shear force becomes uniform, and thus the uneven wear may be reduced. Note that in order to reduce the shear force in the braking direction within the shoulder region, preferred is a narrower sipe width of the constant width sipe as the design of the sipe 43 within the shoulder region. Moreover, if the sipe width of the constant width sipe within the shoulder region is narrow, the rigidity of the tread rubber is improved, and thus the wear resistance performance may be improved.

Note that specifically, it is preferably that the sipe width of the constant width sipe is, e.g., 0.2 mm to 0.4 mm.

Moreover, the spacing t1 between the pair of intermediate sipe wall surface portions 61 of the large intermediate width sipe 4 is, e.g., 0.4 mm to 0.6 mm, and each of the spacing t2 between the pair of bottom-side sipe wall surface portions 62 and the spacing t3 between the pair of tread-surface-side sipe wall surface portions 63 is, e.g., 0.2 mm to 0.3 mm.

Moreover, according to the example of FIG. 1, in a tire with a specified tire mounting direction relative to the vehicle, as mentioned above, in the case where the large intermediate width sipe 4 is arranged only within the central region, and the constant width sipe is arranged only within the shoulder region, it is preferable that the constant width sipe is arranged within the shoulder region on the vehicle mounting direction inner side, and the shoulder region on the vehicle mounting direction outer side is provided with no sipes of any structure. Thereby, as compared to the case where the shoulder region on the vehicle mounting direction outer side is provided with a sipe, the rigidity of the tread rubber within the shoulder region on the vehicle mounting direction outer side may be further improved, and thus it is possible to improve a resisting force against the lateral force at the time of cornering, and to improve the steering stability at the time of cornering.

Note that, it is preferable that the spacing along the tire circumferential direction between the constant width sipe applied as the sipe 43 arranged within the shoulder region and another sipe or groove adjacent to the constant width sipe in the tire circumferential direction is 0.8 to 1.2 times of the spacing along the tire circumferential direction between the large intermediate width sipe 4 applied as the sipes 40 to 42 arranged within the central region and another sipe or grove adjacent to the large intermediate width sipe 4 in the tire circumferential direction. Thereby, by reducing the difference between the central region and the shoulder region of the tire circumferential spacing between sipes or the tire circumferential spacing between a sipe and a groove, uneven wear may become unlikely to occur.

When the central region and the shoulder region are provided with the large intermediate width sipe 4, the dimensions of the large intermediate width sipe 4 within the central region may be different from the dimensions of the large intermediate width sipe 4 within the shoulder region. For example, a ratio of the spacing t2 between the pair of bottom-side sipe wall surface portions 62 or the spacing t3 between the pair of tread-surface-side sipe wall surface portions 63 to the spacing t1 between the pair of intermediate sipe wall surface portions 61 (t2/t1 or t3/t1) within the shoulder region may be smaller than within the central region, and in this case, the wear resistance performance may be improved more securely due to the large intermediate width sipe 4 within the central region, and simultaneously, the rigidity of the tread rubber 50 of the shoulder region may be further improved.

When a developed view of the tread surface 1 is viewed in plan, the large intermediate width sipe 4 may either extend linearly as the example in FIG. 1, or bend or curve at one or more positions while extending.

Moreover, within the tread surface 1, the end of one side or the ends of both sides of the large intermediate width sipe 4 may either, as the example of FIG. 1, open to each groove (in the example of FIG. 1, the circumferential grooves) or the tread ground contact edge TE, or terminate within the land portion.

In the example of FIGS. 2A to 2C, among the pair of wall surfaces facing each other of the large intermediate width sipe 4, on one wall surface (the wall surface on the right side in FIG. 2B), the bottom-side sipe wall surface portion 62, the intermediate sipe wall surface portion 61, the tread-surface-side sipe wall surface portion 63 and the outer side sipe wall surface portion 64 are flush with one another, and on the other wall surface (the wall surface on the left side in FIG. 2B), the intermediate sipe wall surface portion 61 and the outer end sipe wall surface portion 64, which are connected so as to be flush with each other, are located on a side in the width direction SWD of the large intermediate width sipe 4 outer than the bottom-side sipe wall surface portion 62 and the tread-surface-side sipe wall surface portion 63.

Moreover, in the example of FIGS. 2A to 2C, each of the pair of intermediate sipe wall surface portions 61, the pair of bottom-side sipe wall surface portions 62 and the pair of tread-surface-side sipe wall surface portions 63 has a rectangular shape when viewed in plan as illustrated in FIG. 2C.

Moreover, in the example in FIGS. 2A to 2C, the length of the pair of intermediate sipe wall surface portions 61 along the longitudinal direction SLD of the large intermediate width sipe 4 is the same as the length W2 of the pair of bottom-side sipe wall surface portions 62 and the length W3 of the pair of tread-surface-side sipe wall surface portions 63 along the longitudinal direction SLD of the large intermediate width sipe 4.

Next, by referring to FIGS. 3A to 3C, another example (the second example) for the large intermediate width sipe 4 which may be used for the tread surface 1 of the tire of the present embodiment is described centering on the difference from the example for the large intermediate width sipe 4 as illustrated in FIGS. 2A to 2C (the first example). FIG. 3A to FIG. 3C illustrate the second example for the large intermediate width sipe 4, and are respectively drawings corresponding to FIG. 2A to FIG. 2C.

In the present embodiment, the length W1 of the pair of intermediate sipe wall surface portions 61 along the longitudinal direction SLD of the large intermediate width sipe 4 is shorter than each of the length W2 of the pair of bottom-side sipe wall surface portions 62 and the length W3 of the pair of tread-surface-side sipe wall surface portions 63 along the longitudinal direction SLD of the large intermediate width sipe 4 (W1<W2, and W1<W3). Further, each of the portions adjacent to the pair of intermediate sipe wall surface portions 61 on both sides in the longitudinal direction SLD of the large intermediate width sipe 4 is provided with a pair of side sipe wall surface portions 65 facing each other at a spacing smaller than the spacing between the spacing t1 between the pair of intermediate sipe wall surface portions 61.

According to the present embodiment, since the pair of side sipe wall surface portions 65 forming a comparatively small sipe width are provided on both sides along the longitudinal direction SLD of the large intermediate width sipe 4 adjacent to the pair of intermediate sipe wall surface portions 61 forming a comparatively large sipe width, as compared to the first example in FIGS. 2A to 2C, the friction between the sipe wall surfaces at the time of application of the load from directly above is increased, and thus the function for suppress the wear occurrence at the time of application of the load from directly above may be improved.

Note that in the example in FIGS. 3A to 3C, the pair of outer end sipe wall surface portions 64 facing each other at a spacing approximately the same as the spacing t1 between the pair of intermediate sipe wall surface portions 61 are adjacent to the pair of bottom-side sipe wall surface portions 62, the pair of side sipe wall surface portions 65, and the pair of tread-surface-side sipe wall surface portions 63 on outers sides in the longitudinal direction SLD of the large intermediate width sipe 4 on both sides in the longitudinal direction SLD of the large intermediate width sipe 4, and are adjacent to the pair of tread-surface-side sipe wall surface portions 63 on the tread surface 1 side.

Moreover, in the example in FIGS. 3A to 3C, among the pair of wall surfaces facing each other of the large intermediate width sipe 4, on one wall surface (the wall surface on the right side in FIG. 3B), the bottom-side sipe wall surface portion 62, the intermediate sipe wall surface portion 61, the tread-surface-side sipe wall surface portion 63, the outer end sipe wall surface portion 64 and the side sipe wall surface portion 65 are on the same plane, and on the other wall surface (the wall surface on the left side in FIG. 3B), the intermediate sipe wall surface portion 61 and the outer end sipe wall surface portion 64 are located on a side in the width direction SWD of the large intermediate width sipe 4 outer than the bottom-side sipe wall surface portion 62, the tread-surface-side sipe wall surface portion 63 and the side sipe wall surface portion 65, which are connected with each other on the same plane.

Moreover, in the example in FIGS. 3A to 3C, each of the pair of intermediate sipe wall surface portions 61 forms a rectangular shape when viewed in plane as in FIG. 3C.

Figure 4A:
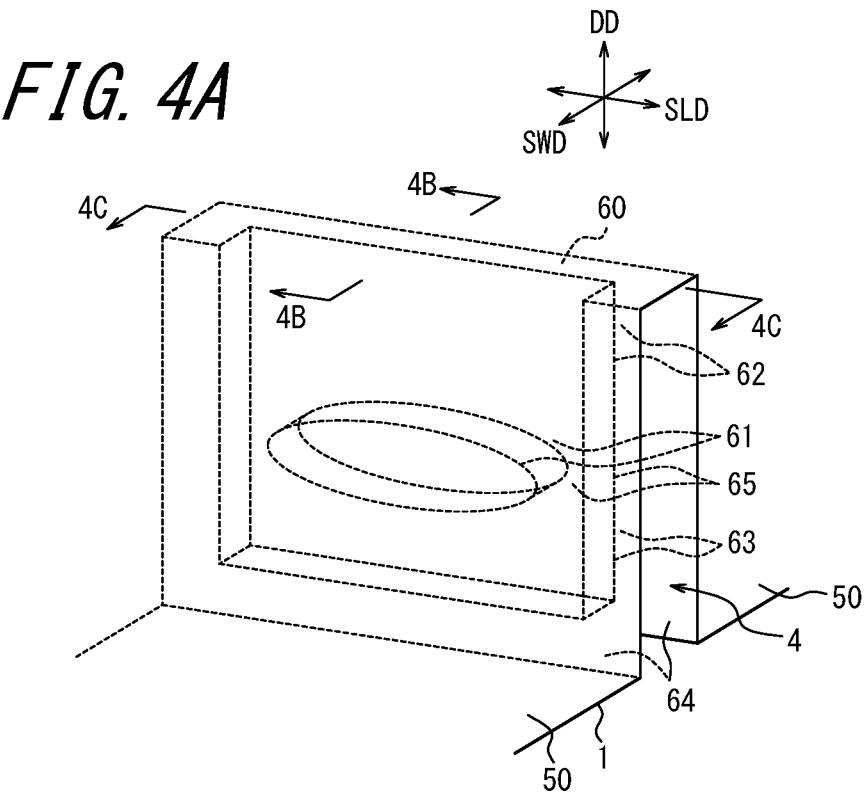
FIGS. 4A to 4C illustrate the third example for the large intermediate width sipe used in one embodiment of the pneumatic tire of this disclosure, where
Figures 4B, 4C:
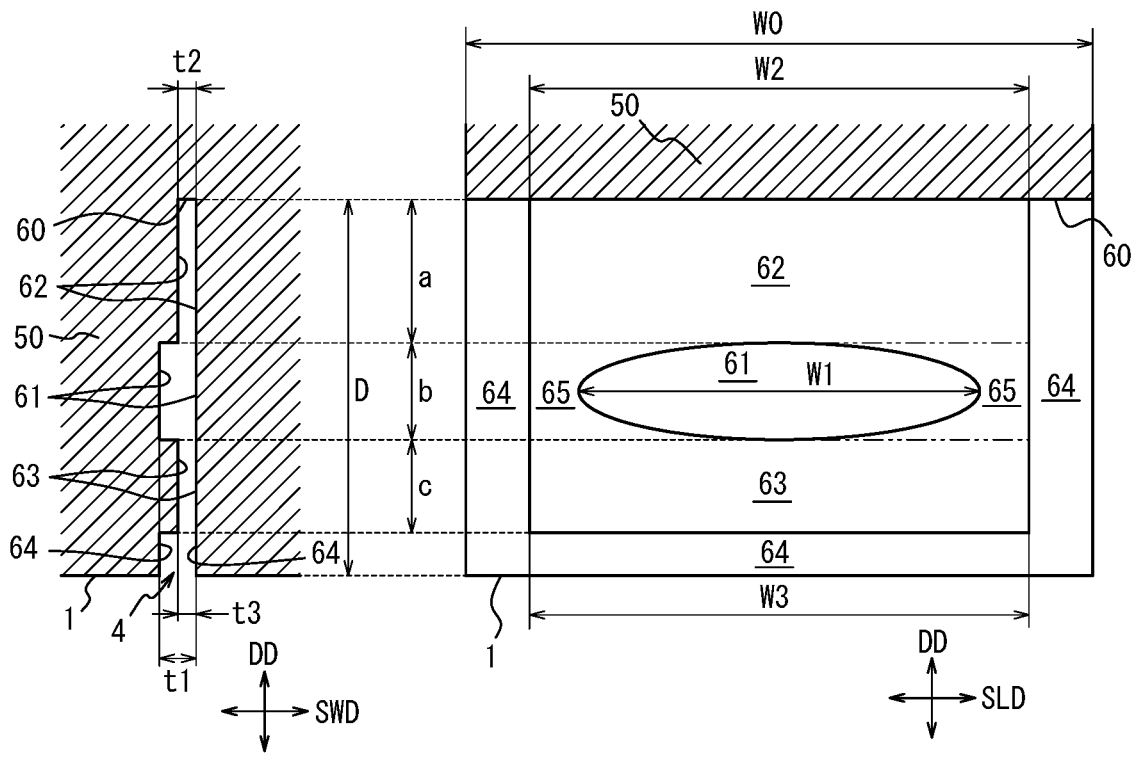

Next, by referring to FIGS. 4A to 4C, another example (the third example) for the large intermediate width sipe 4 which may be used for the tread surface 1 of the tire of the present embodiment is described centering on the difference from the second example for the large intermediate width sipe 4 as illustrated in FIGS. 3A to 3C. FIG. 4A to FIG. 4C illustrate the third example for the large intermediate width sipe 4, and are respectively drawings corresponding to FIG. 3A to FIG. 3C.

The present embodiment is different from the second example in FIGS. 3A to 3C that, as illustrated in FIG. 4C, the pair of intermediate sipe wall surface portions 61 each form an approximately elliptical shape long in the longitudinal direction SLD of the large intermediate width sipe 4.

According to the present embodiment, the same effect as the second example in FIGS. 3A to 3C may be obtained.

Next, by referring to FIGS. 5A to 5C, another example (the fourth example) for the large intermediate width sipe 4 which may be used for the tread surface 1 of the tire of the present embodiment is described centering on the difference from the first example for the large intermediate width sipe 4 as illustrated in FIGS. 2A to 2C. FIG. 5A to FIG. 5C illustrate the fourth example for the large intermediate width sipe 4, and are respectively drawings corresponding to FIG. 2A to FIG. 2C.

The present embodiment, as illustrated in FIG. 5B, is different from the first example in FIGS. 2A to 2C in that on both wall surfaces of the pair of wall surfaces facing each other of the large intermediate width sipe 4, the intermediate sipe wall surface portions 61 and the outer end sipe wall surface portions 64, which are connected to each other on the same plane, are located on sides in the width direction SWD of the large intermediate width sipe 4 outer than the bottom-side sipe wall surface portions 62 and the tread-surface-side sipe wall surface portions 63.

According to the present embodiment, the same effect as the first example in FIGS. 2A to 2C may be obtained.

Next, by referring to FIG. 6, another example (the fifth example) for the large intermediate width sipe 4 which may be used for the tread surface 1 of the tire of the present embodiment is described centering on the difference from the first example for the large intermediate width sipe 4 as illustrated in FIGS. 2A to 2C. FIG. 6 illustrates the fifth example for the large intermediate width sipe 4, and is a cross-sectional view in the sipe width direction SWD corresponding to FIG. 2B.

The present embodiment is different from the first example in FIGS. 2A to 2C that the pair of outer end sipe wall surface portions 64, which face each other at a spacing approximately the same as the spacing t1 between the pair of intermediate sipe wall surface portions 61, are also provided on the end on the tread bottom 60 side of the large intermediate width sipe 4 (a portion adjacent to the pair of bottom-side sipe wall surface portions 62 on the tread bottom 60 side).

According to the present embodiment, since the pair of outer end sipe wall surface portions 64, which form a comparatively large sipe width, are provided on the end on the tread bottom 60 side of the large intermediate width sipe 4, as compared to the first example for the large intermediate width sipe 4 as illustrated in FIGS. 2A to 2C, the rigidity of the sipe blade used at the time of forming the large intermediate width sipe 4 may be further improved.

Note that the large intermediate width sipe 4 used for the tire of the present embodiment is not limited to each aforementioned example, and various modifications and alterations may be made thereto.

Figure 8:
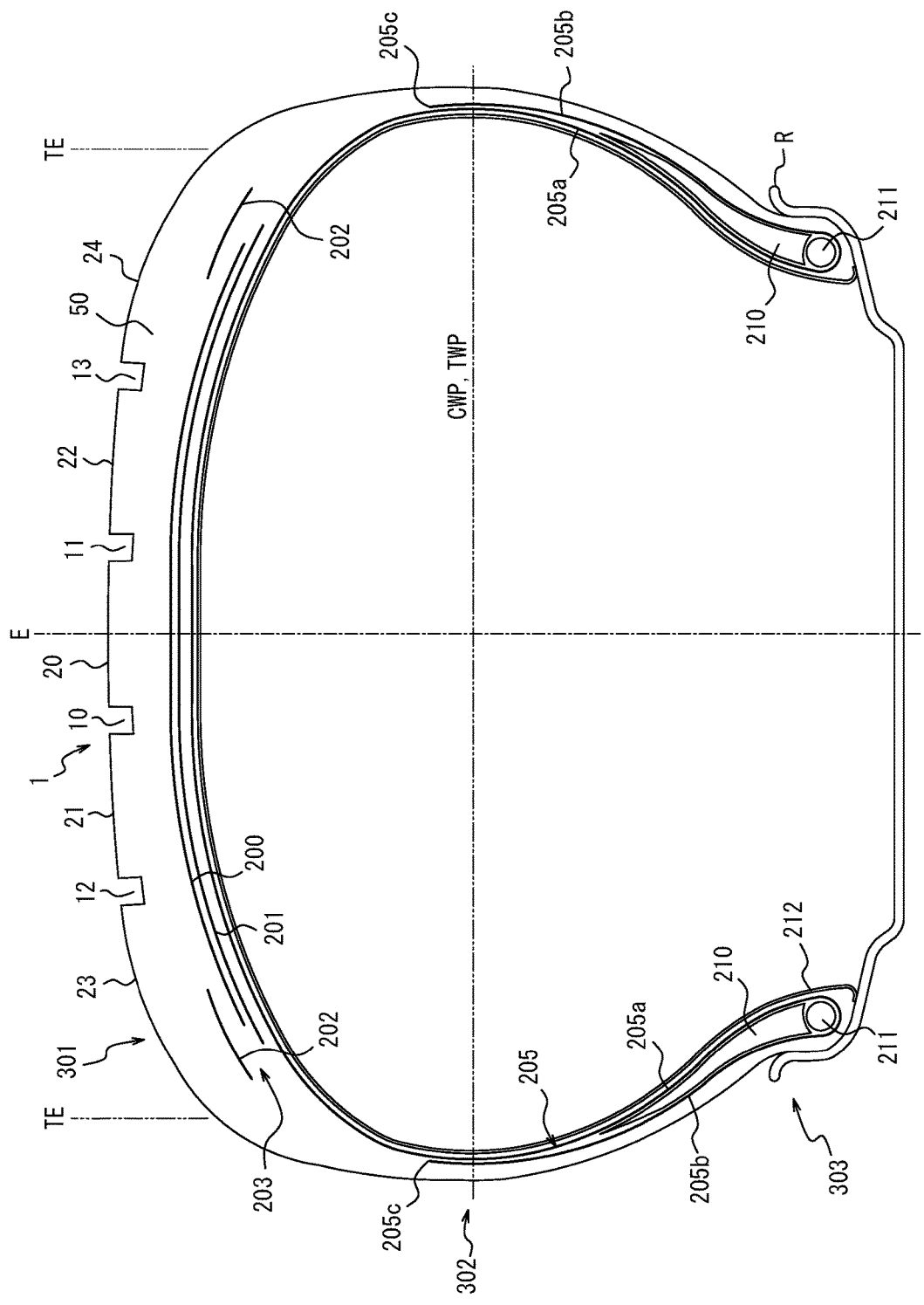
FIG. 8 is a cross-sectional view of the pneumatic tire in the tire width direction according to one embodiment of this disclosure.

Referring to FIG. 8, next, a tire internal structure of the pneumatic tire according to one embodiment of this disclosure will be described. The tire internal structure described below is suitably applicable to the tire of each example described above. FIG. 8 is a cross-sectional view of the pneumatic tire in the tire width direction according to one embodiment of this disclosure. In FIG. 8, the tire is mounted on an applicable rim R having a prescribed internal pressure and no load applied thereto.

The tire according to the present embodiment includes a tread portion 301, a pair of sidewall portions 302 continuous from the tread portion 301 and extending through an outer side in the tire width direction to an inner side in the tire radial direction, and a pair of bead portions 303 continuous from the respective sidewall portions 302 and extending to an inner side in the tire radial direction.

The tire of the present embodiment also includes a carcass 205 composed of one or more carcass plies toroidally extending between the pair of bead portions 303 and including radially arranged cords, a belt 203 composed of one or more belt layers provided on an outer side of a crown portion of the carcass in the tire radial direction, the tread rubber 50 provided on an outer side of the belt 203 in the tire radial direction, and a bead core 211 embedded in the bead portion 303. An outer surface of the tread rubber 50 forms the tread surface 1.

The carcass 205 includes a carcass body portion 205*a* extending from the bead portion 303 to the tread portion 301 via the sidewall portion 302, and a carcass turn-up portion 205*b* wound up outward about the bead core 211 from an inner side in the tire width direction. Although in the example of FIG. 8 the carcass 205 is composed of one carcass ply in which a ply cord is coated with coating rubber, the carcass 205 may be formed by laminating a plurality of carcass plies.

Also, although a metal cord, especially a steel cord is most commonly used as the ply cord constituting the carcass ply, an organic fiber cord may be used. The steel cords may include steel as a main component, and also contain various micro inclusions such as carbon, manganese, silicon, phosphorous, sulfur, copper, and chromium.

The tire of the present embodiment further includes a bead filler 210 disposed between the carcass main body 205*a* and the carcass turn-up portion 205*b* so as to enforce the bead portion 303, and an inner liner 212 having excellent air impermeability disposed on an inner side of the carcass 205 within the tire.

Although the tread rubber 50 is composed of a single rubber layer in the example of FIG. 8, the tread rubber 50 may be composed of a plurality of different rubber layers in the tire radial direction. The plurality of rubber layers described above may have different tangent loss, modulus, hardness, glass transition temperature, material, and the like. Also, ratios of thicknesses of the plurality of rubber layers in the tire radial direction may vary in the tire width direction. Also, a bottom portion and the like of the circumferential grooves 10 to 13 may be composed of a rubber layer different from that in its surrounding region.

Further, the tread rubber 50 may be composed of a plurality of different rubber layers in the tire width direction. The plurality of rubber layers described above may have different tangent loss, modulus, hardness, glass transition temperature, material, and the like. Also, ratios of lengths of the plurality of layers in the tire width direction may vary in the tire radial direction. Further, a limited region such as an area in the vicinity of the circumferential grooves 10 to 13 alone, an area in the vicinity of the tread ground contact edge TE alone, the rib-like shoulder land portions 23 and 24 alone, the rib-like center land portion 20 to 22 alone, or the like may be composed of a rubber layer different from that in its surrounding region.

In the example of FIG. 8, the belt 203 is composed of cords inclined with respect to the tire circumferential direction, and made up of two inclined belt layers 200 and 201 in which the cords cross each other between the layers, and a circumferential cord layer 202 covering tire width direction end portions alone of the inclined belt layers 200 and 201 from on an outer side thereof in the tire radial direction. The circumferential cord layer 202 is composed of cords extending along the tire circumferential direction. However, the belt 203 is not limited to the structure as described above but may have various existing structures in the pneumatic tire used for passenger cars. In particular, the belt 203 is composed of cords inclined with respect to the tire circumferential direction and, by way of example, has a structure made up of two inclined belt layers alone in which the cords are crossing each other between the layers and having different lengths in the tire width direction. Or, the belt 203 may include two inclined belt layers in which the cords are crossing each other between the layers and the circumferential cord layer covering the majority of the inclined belt layers across the tire equatorial plane from the outer side in the tire radial direction.

Note that one inclined belt layer alone may be provided. Or, the inclined belt layer may be substantially composed of one layer by using a pair of inclined belt layers covering half the width of the tire. In this case, the cords of the pair of inclined belt layers intersect with each other.

Here, as illustrated in the example of FIG. 8, when the plurality of inclined belt layers 200 and 201 are provided, a maximum width (a length in the tire width direction) of the inclined belt layer 201 having the largest width is preferably 90 to 115% of a tread width, more preferably 100 to 105%. Here, the "tread width" refers to a distance in the tire width direction between the tread ground contact edges TE.

As the cord constituting the inclined belt layers 200 and 201, although a metal cord, especially the steel cord is most commonly used, the organic fiber cord may be also used. The steel cords may include steel as a main component, and also contain various micro inclusions such as carbon, manganese, silicon, phosphorous, sulfur, copper, and chromium.

Or, as the cord constituting the inclined belt layers 200 and 201, a monofilament cord or a cord composed of multiple twisted filaments may be used. A twist structure may adopt various designs, with various cross-sectional structures, twisting pitches, twisting directions, and distances between filaments adjacent to each other. Further, a cord made by twisting the filaments of different materials may be used, and a cross-sectional structure thereof is not particularly limited but may have various twisted structures such as single-twist, layer twist, multi twist, and the like.

An inclination angle of the cords constituting the inclined belt layers 200 and 201 is preferably 10 degrees or more and 30 degrees or less with respect to the tire circumferential direction.

As the circumferential cord layer 202, a corrugated cord may be used in order to enhance breaking strength. Similarly, to increase the breaking strength, a high elongation cord (having elongation at break of, for example, 4.5 to 5.5%) may be used.

As the cord constituting the circumferential cord layer 202, various materials may be adopted. Typically, rayon, nylon, polyethylene naphthalate (PEN), polyethylene terephthalate (PET), aramid, glass fibers, carbon fiber, steel, and the like may be adopted, with organic fiber cords being particularly preferred in terms of weight reduction.

As the cord constituting the circumferential cord layer 202, the monofilament cord, the cord made by twisting a plurality of filaments, and a hybrid cord made by twisting filaments made of different materials may be adopted.

A thread count of the circumferential cord layer 202 is generally in a range of 20 to 60 cords/50 mm but not limited thereto.

Further, the circumferential cord layer 202 may have a distribution of rigidity, material, the number of layers, the thread count, and the like in the tire width direction. For example, the number of layers may be increased at end portions alone in the tire width direction, or in the center portion alone.

The circumferential cord layer 202 may be designed to be wider or narrower than the inclined belt layers 200 and 201. For example, the circumferential cord layer 202 may have a width at 90 to 110% of the inclined belt layer 201, which is wider than the inclined belt layer 200.

Forming the circumferential cord layer 202 as a spiral layer is particularly advantageous in terms of manufacturing.

Or, the circumferential cord layer 202 may be composed of a strip-shape cord in which a plurality of core filaments arranged parallel to one another in a plane are bundled by a wrapping filament while maintaining the aforementioned parallel arrangement.

Or, the circumferential cord layer 202 may be omitted.

The carcass 205 may employ various structures in the pneumatic tire. For example, in the example of FIG. 8, although a carcass maximum width position CWP in the tire radial direction locates at an approximate central position between the bead portion 303 and the tread portion 301 in the tire radial direction, the carcass maximum width position CWP in the tire radial direction may be positioned closer to the bead portion 303 or the tread portion 301. For example, the carcass maximum width position CWP in the tire radial direction may be provided on an outer side of a bead base (an innermost end of the bead portion 303 in the radial direction, and the same applies hereinafter) in the tire radial direction within a range of 50 to 90% of a tire height (a length of the tire from an innermost end thereof in the tire radial direction to an outermost end).

A thread count of the cords constituting the carcass 205 is generally in a range of 20 to 60 cords/50 mm but not limited thereto.

In the example of FIG. 8, the carcass turn-up end 205c is positioned on an outer side of a tire radial direction outermost end of the bead filler 210 and a tire maximum width position TWP in the tire radial direction. Also, although in the example of FIG. 8 the carcass turn-up end 205c is positioned on an outer side of a tire width direction end of the belt 203 in the tire width direction, the carcass turn-up end 205c may be positioned on an inner side of the tire width direction end of the belt 203 in the tire width direction. Or, the carcass turn-up end 205c may be positioned on an inner side of the outermost end of the bead filler 210 in the tire radial direction. Also, when a plurality of carcass plies are provided, each of the carcass plies may have the turn-up end 205c at different positions in the tire radial direction. Or, a structure in which, without the carcass turn-up portion 205b at all, an end of the carcass body portion 205a is pinched by a plurality of bead core members or wound about the bead core 211 may be employed.

The tire maximum width position TWP in the tire radial direction may be provided on an outer side of the bead base in the tire radial direction within a range of 50 to 90% of the tire height.

Although in the example of FIG. 8 the carcass maximum width position CWP in the tire radial direction matches the tire maximum width position TWP, these positions may be different from each other.

Further, the sidewall portion 302 may have a rim guard.

Note that the tire of the present embodiment may omit the bead filler 210.

The bead core 211 may have various structures in the pneumatic tire including a circular shape or a polygonal shape when viewed in a cross-section in the tire width direction.

The bead portion 303 may be further provided with a rubber layer, a cord layer, or the like for the purpose of reinforcement. Such additional members may be provided at various positions of the carcass 205 and bead filler 210.

The inner liner 212 may be composed of a rubber layer mainly made of butyl rubber, a film layer mainly made of resin, or a combination thereof.

A tire inner surface, in order to reduce cavity resonance, may have a porous member, or may be subjected to electrostatic flocking processing.

Also, the tire inner surface may have a sealant member for preventing air leakage in case of puncture.

The tire of the present embodiment may have the sidewall portion 302 including crescent-shaped reinforcing rubber, thereby functioning as a side-reinforced run flat tire.

EXAMPLES

To confirm the effects of this disclosure, tires of Comparative Examples 1 to 3 and Examples 1 to 7 were evaluated by conducting simulations and experiments. For each of the tires, block models 70 in the same shape having different sipes and block samples having the same structure as the block model 70 were prepared. Further, with the method mentioned below, based on results obtained from the simulations and experiments using each block model 70 and block sample, performances of each corresponding tire were evaluated.

Figure 9:
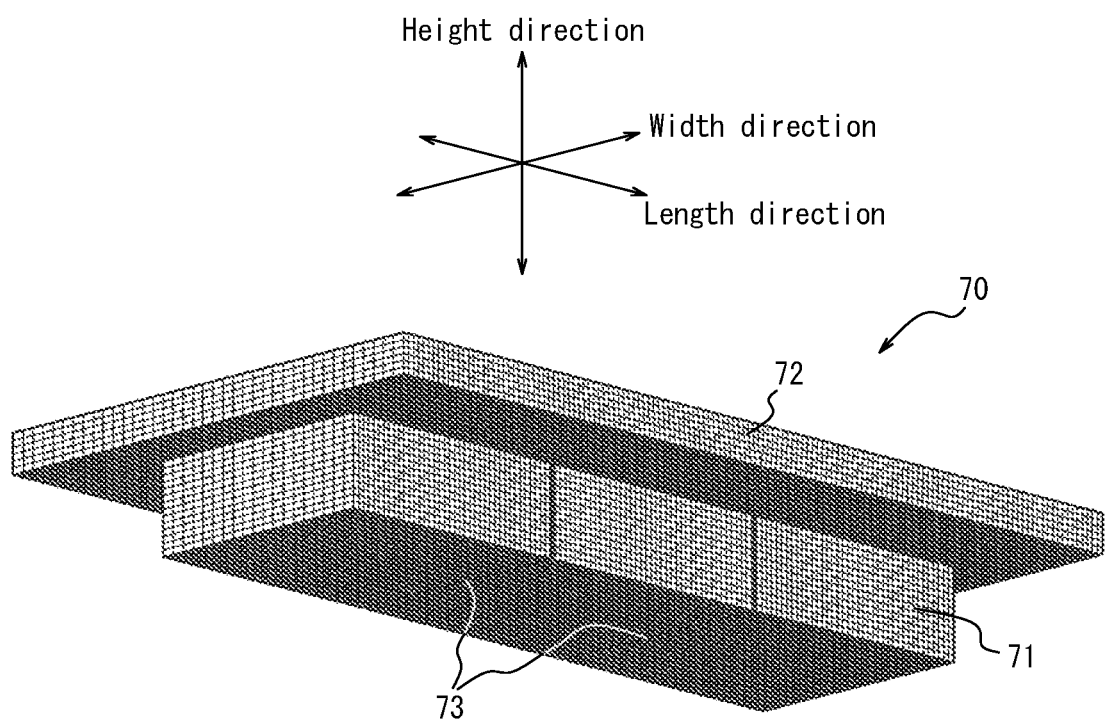
FIG. 9 describes FEM calculation.

Each of the block models 70, as illustrated in FIG. 9, includes a block portion 71 formed in the shape of a rectangular parallelepiped with 60 mm in length×20 mm in width×7 mm in height and a base portion 72 fixed to an upper surface of the block portion 71 and extending longer than the block portion 71 in a longitudinal direction and a width direction. The block portion 71 is provided with two sipes 73 with specifications shown in Table 1. These two sipes 73, at respective positions, remote from either end of a longitudinal direction of the block portion 71 by 20 mm and extend throughout the width and height of the block portion 71 along a width direction and a height direction thereof.

Table 1 set forth below. Note that in Table 1 the larger the index representing the result of the evaluation, the better the wear resistance.

TABLE 1

|  | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|
| Sipe shape | FIGS. 10A and 10B | FIGS. 10A and 10B | FIGS. 10A and 10B | FIGS. 2A to 2C | FIGS. 2A to 2C | FIGS. 2A to 2C | FIGS. 2A to 2C | FIGS. 2A to 2C | FIGS. 2A to 2C | FIGS. 2A to 2C |
| Circumferential spacing between sipes/D | 4.0 | 3.0 | 3.0 | 3.0 | 3.0 | 2.0 | 2.0 | 2.0 | 2.0 | 2.0 |
| t1 (mm) | 1.0 | 1.0 | 0.3 | 0.6 | 0.6 | 1.0 | 0.4 | 1.0 | 1.0 | 1.0 |
| t2/t1 | 1.0 | 1.0 | 1.0 | 0.5 | 0.5 | 0.3 | 0.8 | 0.3 | 0.3 | 0.3 |
| W2/W0 | 1.0 | 1.0 | 1.0 | 1.0 | 0.8 | 1.0 | 1.0 | 0.7 | 1.0 | 1.0 |
| b/D | — | — | — | 0.15 | 0.15 | 0.10 | 0.10 | 0.10 | 0.30 | 0.10 |
| Wear resistance performance (index) | 100 | 104 | 105 | 110 | 110 | 120 | 112 | 118 | 116 | 112 |

In Table 1, the sipes 73 of Comparative Examples 1 to 3, as illustrated in FIGS. 10A and 10B, were designed as constant width sipes having a pair of flat sipe wall surfaces extending across the entire sipe depth and facing each other at a constant spacing. Moreover, the sipes 73 of Examples 1 to 7 were formed with the first example for the large intermediate width sipe 4 as described by referring to FIGS. 2A to 2C. In Examples 1 to 7, the spacing t2 between the pair of bottom-side sipe wall surface portions and the spacing t3 between the pair of tread-surface-side sipe wall surface portions were set identical (t2=t3). Moreover, in Examples 1 to 7, the length W2 along the longitudinal direction of the sipe of the pair of bottom-side sipe wall surface portions and the length W3 along the longitudinal direction of the sipe of the pair of tread-surface-side sipe wall surface portions were set identical (W2=W3).

Each of the tires was subjected to evaluation of wear resistance described below. Moreover, when the sipe depth of the sipe is D, and the length of the pair of intermediate sipe wall surface portions along the tire radial direction is b, in Examples 1 to 7, the length a of the pair of bottom-side sipe wall surface portions along the tire radial direction was set to a=(D−b)/2, and the length c of the pair of tread-surface-side sipe wall surface portions along the tire radial direction was set to c=(D−b)/3.

(Wear Resistance Test)

First, by using an FEM (Finite Element Method) calculation, in a state in which the block model 70, as a road surface side, was pressed against a road surface model and having a load of 300 kPa applied thereto and the shear force with shear strain within a range of 5 to 10% acting thereon, shear rigidity of the block portion 71 was calculated. Also, an actual block sample similar to the block model 70 was prepared and, under the same condition as described above, the shear force was applied by an experiment, and the sheer rigidity at that time was obtained. Then, based on a result of the calculation using the FEM calculation and a result of the test using the block sample, the sheer rigidity was obtained.

Also, by using the FEM calculation, the shear force acting on each block sample was estimated.

Then, wear energy was estimated based on the shear rigidity and the shear force obtained in the above manner, and the wear energy thus estimated was evaluated as wear performance of each of the above tires represented by a relative index. Results of the evaluations were shown in As can be seen in Table 1, it was found that the tires of Examples 1 to 7, as compared with the tires of Comparative Examples 1 to 3, may obtain excellent wear resistance.

Note that tire models having the tread pattern in FIG. 1 was produced, and the sipes 40 to 42 within the central region of these tire models are formed with the large intermediate width sipe of the aforementioned Example 3, and the sipes 43 within the shoulder region thereof was formed with a constant width sipe with a sipe width of 0.3 mm. As a result of evaluating the wear resistance performance of these tire models via FEM calculation, etc. under the same conditions as mentioned above, the index value was 124.

INDUSTRIAL APPLICABILITY

This disclosure may be used in the pneumatic tire of any type such as a general tire (a summer tire or an all-season tire) non-specialized for ice or snow.

REFERENCE SIGNS LIST

1, 100 tread surface
4 large intermediate width sipe
40-43, 73, 400 sipe
10-13 circumferential groove
20-22 rib-like center land portion
23, 24 rib-like shoulder land portion
30, 31 lug groove
50 tread rubber
60 sipe bottom
61 intermediate sipe wall surface portion
62 bottom-side sipe wall surface portion
63 tread-surface-side sipe wall surface portion
64 outer end sipe wall surface portion
65 side sipe wall surface portion
70 block model
71 block portion
72 base portion
200, 201 inclined belt layer
202 circumferential cord layer
203 belt
205 carcass
205*a* carcass body portion
205*b* carcass turn-up portion
205*c* carcass turn-up end 301 tread portion
302 sidewall portion
303 bead portion
210 bead filler
211 bead core
212 inner liner
CWP carcass maximum width position
E tire equatorial plane
TE tread ground contact edge
TWP tire maximum width position
R applicable rim

The invention claimed is:

1. A pneumatic tire comprising a plurality of sipes on a tread surface, wherein:
the plurality of sipes include a large intermediate width sipe having:
a pair of intermediate sipe wall surface portions being located on an intermediate portion of the sipe in a tire radial direction, and facing each other at a constant spacing t1;
a pair of bottom-side sipe wall surface portions being adjacent to the intermediate sipe wall surface portions on a sipe bottom side of the sipe, and facing each other at a constant spacing t2 smaller than the constant spacing t1 between the pair of intermediate sipe wall surface portions; and
a pair of tread-surface-side sipe wall surface portions being adjacent to the intermediate sipe wall surface portions on the tread surface side, and facing each other at a constant spacing t3 smaller than the constant spacing t1 between the pair of intermediate sipe wall surface portions; and
a spacing along a tire circumferential direction between the large intermediate width sipe arranged within a central region of the tread surface and another sipe or groove arranged within the central region of the tread surface and adjacent to the large intermediate width sipe in the tire circumferential direction is 2.0 to 4.0 times of a sipe depth D of the large intermediate width sipe,
the large intermediate width sipe further has a pair of outer end sipe wall surface portions extending across an entire length in the tire radial direction of the large intermediate width sipe on ends of both sides in a longitudinal direction of the large intermediate width sipe that is a direction along a sipe widthwise central line of the large intermediate width sipe when a developed view of the tread surface is viewed in plan, and
the pair of outer end sipe wall surface portions extend across the entire length in the longitudinal direction of the large intermediate width sipe on an end on the tread surface side of the large intermediate width sipe, and face each other at the constant spacing t1 between the pair of intermediate sipe wall surface portions.

2. The pneumatic tire according to claim 1, wherein:
the large intermediate width sipe is configured such that each of the constant spacing t2 between the pair of bottom-side sipe wall surface portions and the constant spacing t3 between the pair of tread-surface-side sipe wall surface portions is 0.3 to 0.75 times of the constant spacing t1 between the pair of intermediate sipe wall surface portions.

3. The pneumatic tire according to claim 1, wherein:
the large intermediate width sipe is configured such that each of a length W2 of the pair of bottom-side sipe wall surface portions along a longitudinal direction of the large intermediate width sipe and a length W3 of the pair of tread-surface-side sipe wall surface portions along the longitudinal direction of the large intermediate width sipe is 0.7 to 1.0 times of a length W0 of the large intermediate width sipe along the longitudinal direction of the large intermediate width sipe.

4. The pneumatic tire according to claim 1, wherein:
the large intermediate width sipe is configured such that:
a length b of the pair of intermediate sipe wall surface portions along the tire radial direction is 0.1 to 0.3 times of the sipe depth D of the large intermediate width sipe; and
a central position of the pair of intermediate sipe wall surface portions in the tire radial direction matches a central position of the large intermediate width sipe in the tire radial direction.

5. The pneumatic tire according to claim 1, wherein:
the large intermediate width sipe is configured such that with the sipe depth of the large intermediate width sipe being D, and the length of the pair of intermediate sipe wall surface portions along the tire radial direction being b, each of a length a of the pair of bottom-side sipe wall surface portions and a length c of the pair of tread-surface-side sipe wall surface portions along the tire radial direction is $(D-b)/2$ or less.

6. The pneumatic tire according to claim 1, wherein:
the plurality of sipes further includes a constant width sipe having a pair of sipe wall surfaces, the pair of sipe wall surfaces extending across an entire sipe depth and facing each other at a constant spacing;
the large intermediate width sipe is arranged only within the central region of the tread surface, each of the pair of intermediate sipe wall surface portions, the pair of bottom-side sipe wall surface portions and the pair of tread-surface-side sipe wall surface portions of the large intermediate width sipe being flat and extending in the same planar direction with each other;
the constant width sipe is arranged only within a shoulder region located on a tire widthwise side outer than the central region on the tread surface, each of the pair of sipe wall surfaces of the constant width sipe being flat; and
a sipe width of the constant width sipe is smaller than an average value of a maximum value and a minimum value of a sipe width of the large intermediate width sipe.

7. The pneumatic tire according to claim 6, wherein:
the pneumatic tire has a specified tire mounting direction relative to the vehicle, such that:
the constant width sipe is arranged only within the shoulder region on a vehicle mounting direction inner side on the tread surface, and
the shoulder region on a vehicle mounting direction outer side on the tread surface is provided with no sipes.

8. The pneumatic tire according to claim 6, wherein:
a spacing along the tire circumferential direction between the constant width sipe arranged within the shoulder region of the tread surface and another sipe or groove arranged within the shoulder region of the tread surface and adjacent to the constant width sipe in the tire circumferential direction is 0.8 to 1.2 times of a spacing along the tire circumferential direction between the large intermediate width sipe arranged within the central region of the tread surface and another sipe or groove arranged within the central region of the tread surface and adjacent to the large intermediate width sipe in the tire circumferential direction.

9. The pneumatic tire according to claim 2, wherein:
the large intermediate width sipe is configured such that each of a length W2 of the pair of bottom-side sipe wall surface portions along a longitudinal direction of the large intermediate width sipe and a length W3 of the pair of tread-surface-side sipe wall surface portions along the longitudinal direction of the large intermediate width sipe is 0.7 to 1.0 times of a length W0 of the large intermediate width sipe along the longitudinal direction of the large intermediate width sipe.

10. The pneumatic tire according to claim 2, wherein:
the large intermediate width sipe is configured such that:
a length b of the pair of intermediate sipe wall surface portions along the tire radial direction is 0.1 to 0.3 times of the sipe depth D of the large intermediate width sipe; and
a central position of the pair of intermediate sipe wall surface portions in the tire radial direction matches a central position of the large intermediate width sipe in the tire radial direction.

11. The pneumatic tire according to claim 2, wherein:
the large intermediate width sipe is configured such that with the sipe depth of the large intermediate width sipe being D, and the length of the pair of intermediate sipe wall surface portions along the tire radial direction being b, each of a length a of the pair of bottom-side sipe wall surface portions and a length c of the pair of tread-surface-side sipe wall surface portions along the tire radial direction is (D−b)/2 or less.

12. The pneumatic tire according to claim 2, wherein:
the plurality of sipes further includes a constant width sipe having a pair of sipe wall surfaces, the pair of sipe wall surfaces extending across an entire sipe depth and facing each other at a constant spacing;
the large intermediate width sipe is arranged only within the central region of the tread surface, each of the pair of intermediate sipe wall surface portions, the pair of bottom-side sipe wall surface portions and the pair of tread-surface-side sipe wall surface portions of the large intermediate width sipe being flat and extending in the same planar direction with each other;
the constant width sipe is arranged only within a shoulder region located on a tire widthwise side outer than the central region on the tread surface, each of the pair of sipe wall surfaces of the constant width sipe being flat; and
a sipe width of the constant width sipe is smaller than an average value of a maximum value and a minimum value of a sipe width of the large intermediate width sipe.

13. The pneumatic tire according to claim 7, wherein:
a spacing along the tire circumferential direction between the constant width sipe arranged within the shoulder region of the tread surface and another sipe or groove arranged within the shoulder region of the tread surface and adjacent to the constant width sipe in the tire circumferential direction is 0.8 to 1.2 times of a spacing along the tire circumferential direction between the large intermediate width sipe arranged within the central region of the tread surface and another sipe or groove arranged within the central region of the tread surface and adjacent to the large intermediate width sipe in the tire circumferential direction.

14. The pneumatic tire according to claim 3, wherein:
the large intermediate width sipe is configured such that:
a length b of the pair of intermediate sipe wall surface portions along the tire radial direction is 0.1 to 0.3 times of the sipe depth D of the large intermediate width sipe; and
a central position of the pair of intermediate sipe wall surface portions in the tire radial direction matches a central position of the large intermediate width sipe in the tire radial direction.

15. The pneumatic tire according to claim 3, wherein:
the large intermediate width sipe is configured such that with the sipe depth of the large intermediate width sipe being D, and the length of the pair of intermediate sipe wall surface portions along the tire radial direction being b, each of a length a of the pair of bottom-side sipe wall surface portions and a length c of the pair of tread-surface-side sipe wall surface portions along the tire radial direction is (D−b)/2 or less.

16. The pneumatic tire according to claim 3, wherein:
the plurality of sipes further includes a constant width sipe having a pair of sipe wall surfaces, the pair of sipe wall surfaces extending across an entire sipe depth and facing each other at a constant spacing;
the large intermediate width sipe is arranged only within the central region of the tread surface, each of the pair of intermediate sipe wall surface portions, the pair of bottom-side sipe wall surface portions and the pair of tread-surface-side sipe wall surface portions of the large intermediate width sipe being flat and extending in the same planar direction with each other;
the constant width sipe is arranged only within a shoulder region located on a tire widthwise side outer than the central region on the tread surface, each of the pair of sipe wall surfaces of the constant width sipe being flat; and
a sipe width of the constant width sipe is smaller than an average value of a maximum value and a minimum value of a sipe width of the large intermediate width sipe.

17. The pneumatic tire according to claim 4, wherein:
the large intermediate width sipe is configured such that with the sipe depth of the large intermediate width sipe being D, and the length of the pair of intermediate sipe wall surface portions along the tire radial direction being b, each of a length a of the pair of bottom-side sipe wall surface portions and a length c of the pair of tread-surface-side sipe wall surface portions along the tire radial direction is (D−b)/2 or less.

18. The pneumatic tire according to claim 4, wherein:
the plurality of sipes further includes a constant width sipe having a pair of sipe wall surfaces, the pair of sipe wall surfaces extending across an entire sipe depth and facing each other at a constant spacing;
the large intermediate width sipe is arranged only within the central region of the tread surface, each of the pair of intermediate sipe wall surface portions, the pair of bottom-side sipe wall surface portions and the pair of tread-surface-side sipe wall surface portions of the large intermediate width sipe being flat and extending in the same planar direction with each other;
the constant width sipe is arranged only within a shoulder region located on a tire widthwise side outer than the central region on the tread surface, each of the pair of sipe wall surfaces of the constant width sipe being flat; and a sipe width of the constant width sipe is smaller than an average value of a maximum value and a minimum value of a sipe width of the large intermediate width sipe.

19. The pneumatic tire according to claim 5, wherein:

the plurality of sipes further includes a constant width sipe having a pair of sipe wall surfaces, the pair of sipe wall surfaces extending across an entire sipe depth and facing each other at a constant spacing;

the large intermediate width sipe is arranged only within the central region of the tread surface, each of the pair of intermediate sipe wall surface portions, the pair of bottom-side sipe wall surface portions and the pair of tread-surface-side sipe wall surface portions of the large intermediate width sipe being flat and extending in the same planar direction with each other;

the constant width sipe is arranged only within a shoulder region located on a tire widthwise side outer than the central region on the tread surface, each of the pair of sipe wall surfaces of the constant width sipe being flat; and a sipe width of the constant width sipe is smaller than an average value of a maximum value and a minimum value of a sipe width of the large intermediate width sipe.

20. The pneumatic tire according to claim 9, wherein:

the large intermediate width sipe is configured such that:

a length b of the pair of intermediate sipe wall surface portions along the tire radial direction is 0.1 to 0.3 times of the sipe depth D of the large intermediate width sipe; and a central position of the pair of intermediate sipe wall surface portions in the tire radial direction matches a central position of the large intermediate width sipe in the tire radial direction.

* * * * *